United States Patent [19]
van der Lely

[11] 4,208,863
[45] Jun. 24, 1980

[54] AGRICULTURAL MACHINE

[76] Inventor: Cornelis van der Lely, 7, Brüschenrain, Zug, Switzerland

[21] Appl. No.: 749,172

[22] Filed: Dec. 9, 1976

[30] Foreign Application Priority Data

Dec. 12, 1975 [NL] Netherlands .................... 7514498

[51] Int. Cl.³ ............................................. A01D 77/06
[52] U.S. Cl. ........................................ 56/377; 56/370
[58] Field of Search .............. 56/370, 376, 377, 30, 56/48, 27.5, 12.8, 13.3

[56] References Cited
U.S. PATENT DOCUMENTS

| | | | |
|---|---|---|---|
| 1,447,328 | 3/1923 | Rycroft | 56/48 |
| 2,836,951 | 6/1958 | Annis | 56/30 |
| 2,896,398 | 7/1959 | Green | 56/48 |
| 2,929,188 | 3/1960 | Talkington, Sr. | 56/30 |
| 3,611,690 | 10/1971 | Zweegers | 56/366 |
| 3,832,838 | 9/1974 | Hale | 56/377 |

*Primary Examiner*—Russell R. Kinsey
*Attorney, Agent, or Firm*—Mason, Mason and Albright

[57] ABSTRACT

An agricultural machine, such as a haymaker, for the displacement of stalks, comprising a movable air-permeable screen and air displacing means arranged to induce a pressure difference across the screen thereby to cause stalks to adhere to the screen under the effect of suction. In a preferred embodiment, a blocking member is disposed to prevent the application of suction at one region of the screen to allow stalks adhering to the screen to be deposited. The air displacing means may be arranged to provide an air cushion under the machine to support the machine above the ground.

99 Claims, 18 Drawing Figures

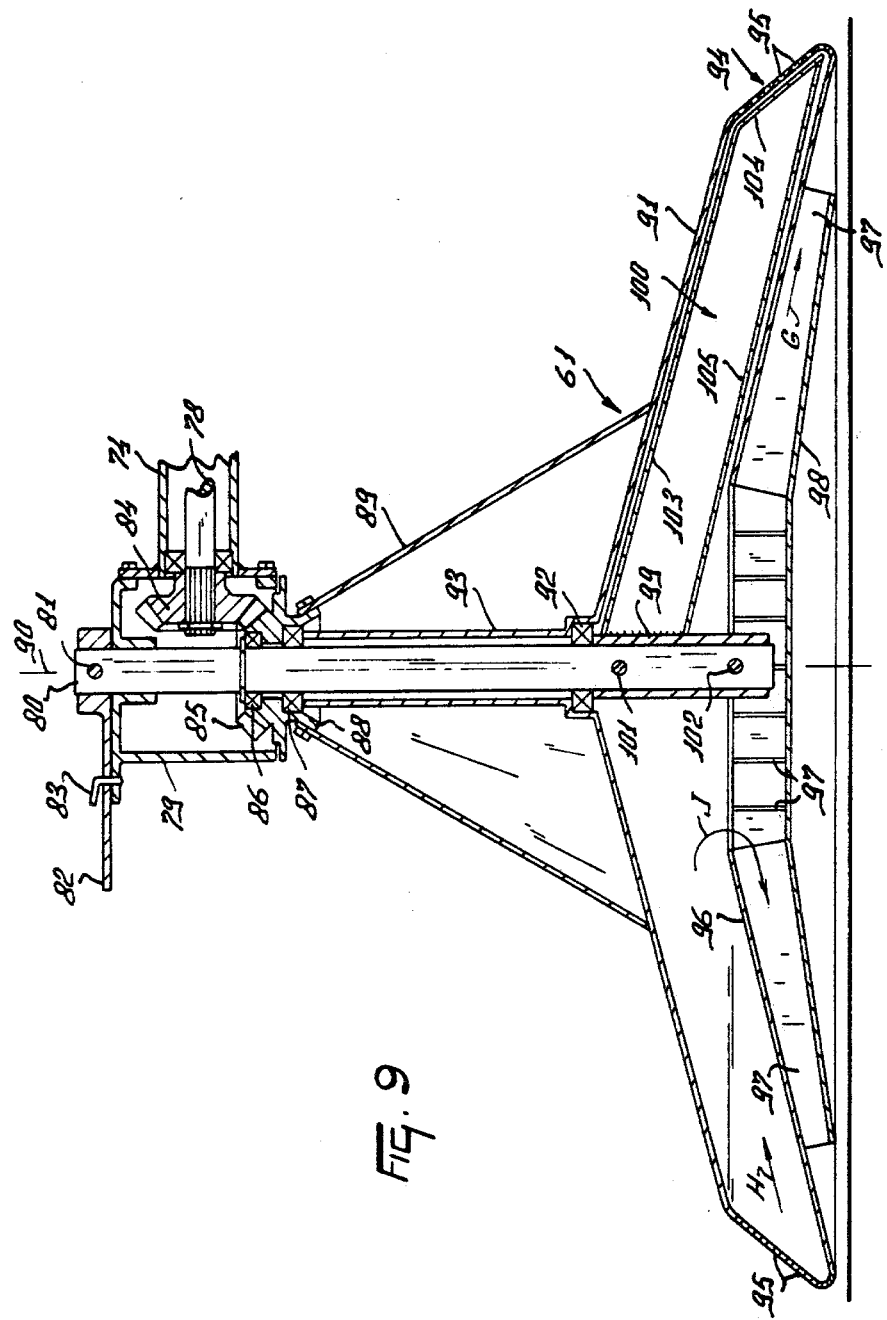

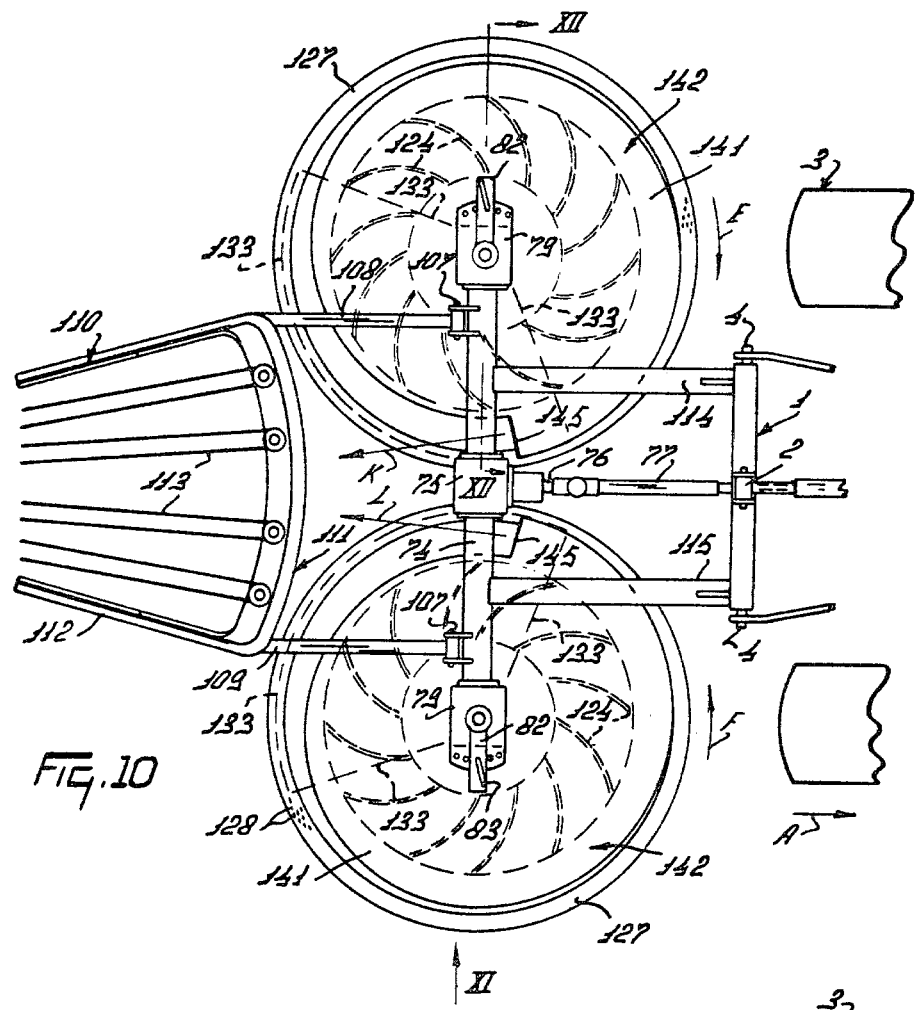
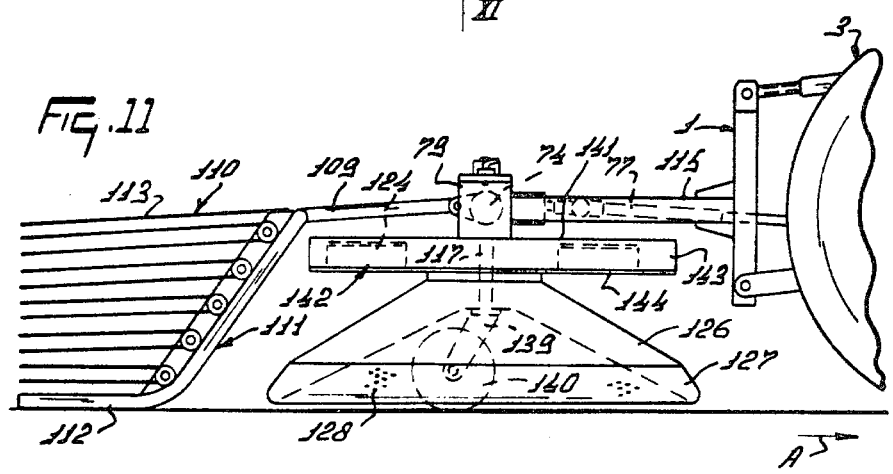

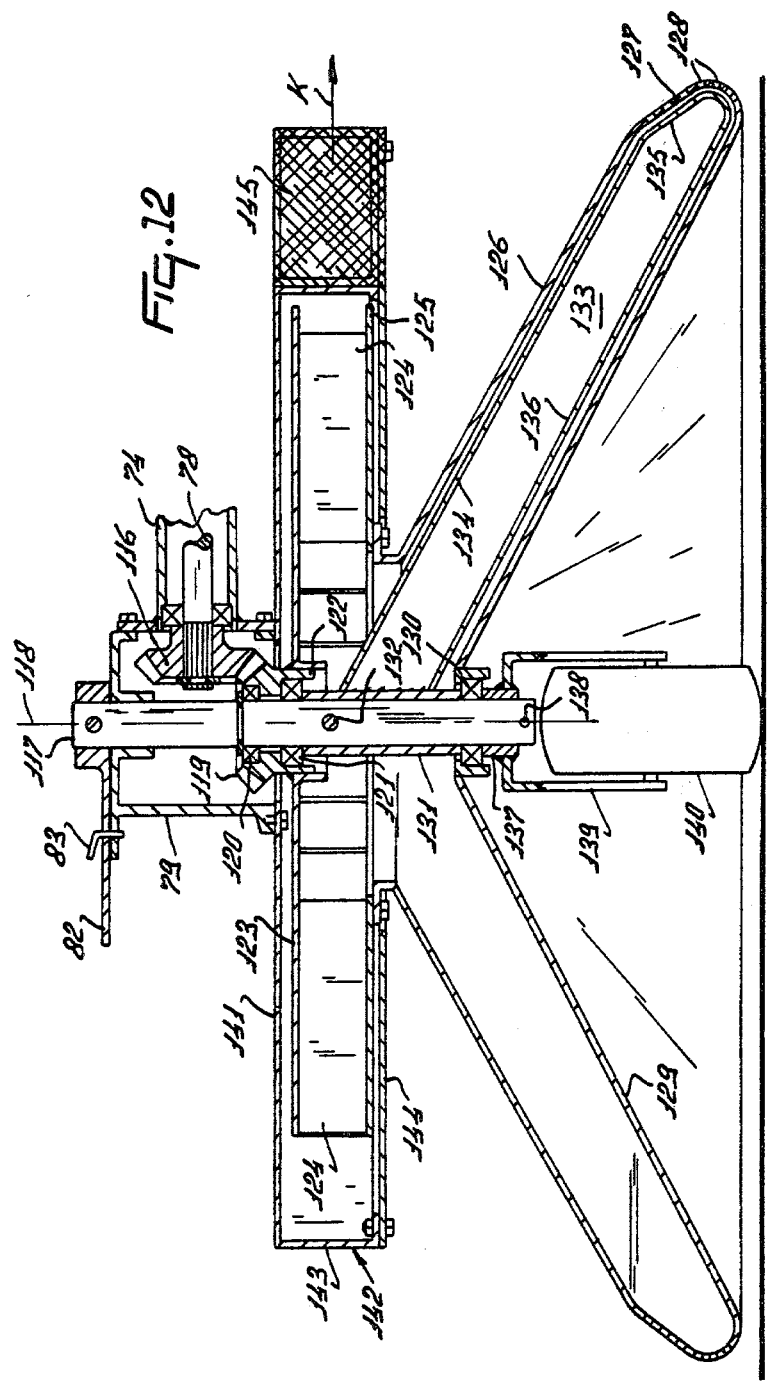

1

AGRICULTURAL MACHINE

BACKGROUND OF THE INVENTION

This invention relates to an agricultural machine comprising a device for displacing stalks, for example a haymaking machine.

Conventional machines employ rotatable tines for displacing the crop.

These conventional machines have the disadvantage that these tines frequently do not pick up the whole crop, particularly stalks or stems lying among the stubble. Moreover, the tines may seriously damage young plants growing among the stubble. Broken-off pieces of tines are often left behind and may spoil the harvested crop and cause damage to machinery.

The invention has for its object to eliminate these disadvantages.

SUMMARY OF THE INVENTION

According to the present invention there is provided an agricultural machine for the displacement of stalks comprising a movable air-permeable screen and air displacing means arranged to induce a pressure difference across the screen thereby to cause stalks to adhere to the screen under the effect of suction.

Using a machine in accordance with the present invention, stalks lying on the ground are very thoroughly picked up and even stalks lying among the stubbles are picked up, while damage of young plants caused by tines is no longer possible.

BRIEF DESCRIPTION OF THE DRAWINGS

FIG. 5 is a sectional view taken on the lines V—V in FIG. 1.

FIG. 9 is a sectional view taken on the lines IX—IX in FIG. 7.

FIG. 10 is a plan of a third embodiment of a machine in accordance with the invention.

FIG. 11 is a side elevation of the machine shown in FIG. 10 viewed in the direction of the arrow XI in FIG. 10.

FIG. 12 is a sectional view taken on the lines XII—XII in FIG. 10.

DETAILED DESCRIPTION OF SOME PREFERRED EMBODIMENTS

Figure 1:
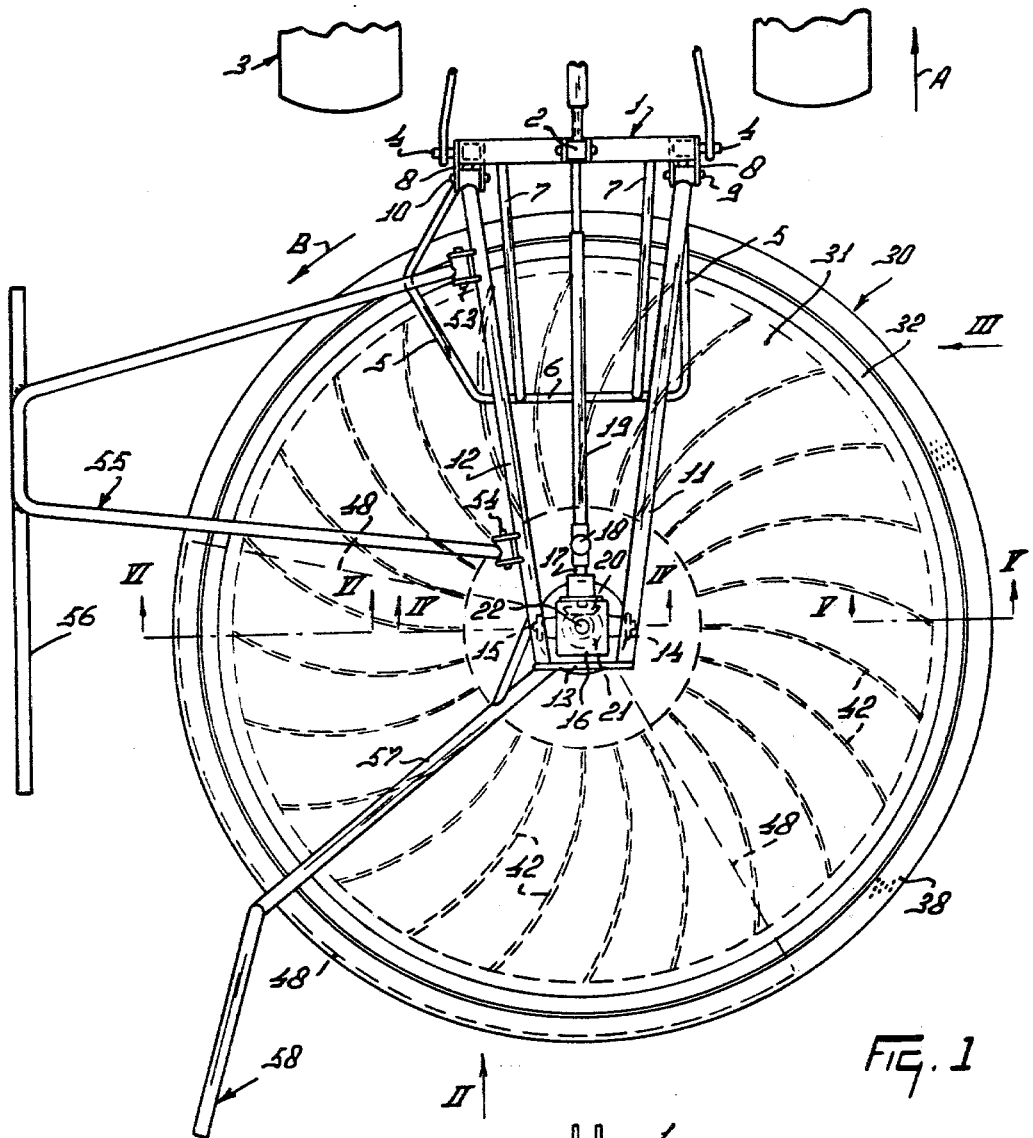
FIG. 1 is a plan view of a first embodiment of a machine in accordance with the invention.

The agricultural machine shown in FIGS. 1 to 6 comprises a frame having a trestle 1 in the shape of an inverted U and having on the top side a member 2 for fastening to the top arm of the three-point lifting device of a tractor 3 and having at the two lower ends fastening members 4 for the attachment to the two lower arms of the lifting device. Near the two lower fastening members 4 the portions of the trestle 1 inclined upwardly towards the center of the trestle have rigidly secured to them carrying rods 5, which extend substantially horizontally to the rear in operation from the trestle 1, with respect to the intended direction of travel A. The ends of the carrying rods 5 remote from the trestle 1 are coupled with one another by means of a horizontal tie beam 6 extending transversely of the direction of movement A, the trestle 1 together with the carrying rods 5 and the tie beam 6 forming a single, rigid unit. This unit is reinforced by two lifting rods 7, located symmetrically one on each side of the vertical plane of symmetry of the trestle 1, the rods 7 being rigidly secured at the front to points of the trestle 1 located one on each side of the fastening member 2, whereas at the rear the rods 7 are rigidly secured to the tie beam 6 at points located at a short distance from the junctions of the carrying rods 5 and the tie beam 6. The two lifting rods 7 are inclined downwardly away from the trestle 1 to the rear. The two portions of the trestle 1 inclined downwardly and upwardly from the fastening members 4 have welded to them near the two fastening members 4 tags 8 protruding rearwardly and carrying horizontal pivotal shafts 9 and 10, extending transversely of the direction of movement A, near the ends remote from the trestle 1. To the pivotal shafts 9 and 10 are pivoted frame beams 11 and 12 extending in operation in a substantially horizontal direction towards the rear. With respect to the vertical plane of symmetry of the trestle 1 extending in the direction of movement, the two frame beams 11 and 12 are arranged to converge towards the rear, their rear ends being spaced apart from one another and being rigidly interconnected by means of a tie member 13. The beams 11 and 12 are provided at a short distance in front of the tie member 13 on the lower side with a tag 14 each. Each tag 14 holds a horizontal pivotal shaft 15, extending transversely of the direction of movement A so that the center line of the pivotal shaft 15 associated with the beam 11 is in line with that associated with the beam 12. By means of the pivotal shafts 15 a gear box 16 is pivotally fastened to the beams 11 and 12.

The gear box 16 comprises an input shaft 17 extending in operation in a substantially horizontal direction towards the front. To this shaft can be connected an auxiliary shaft 19 by means of a universal coupling 18, shaft 19 being adapted to be driven by the tractor 3. The gear box 16 comprises a bevel gear wheel 20 (FIG. 4), which is driven via the input shaft 17 and which is in mesh with a bevel gear wheel 21 mounted on a shaft 22 for rotation relative to the shaft 22. The center line 23 of the shaft 22 is in operation substantially vertical. Near its top end the shaft 22 has a bore through which a pin 24 extends, which pin also passes through bores provided in the gear box 16 so that the shaft 22 is rigidly secured against rotation with respect to the gear box 16. On the top side of the gear box 16, near the pin 24, the shaft 22 is disposed in a comparatively long bore in the gear box 16. The gear box 16 is partly closed on its bottom side by a plate 25, which is circular viewed on plan and which has a circular opening at the center, which closely engages the outer surface of the hub of the gear wheel 21. Near its outer circumference the plate 25 has a circular, downwardly extending rim 26.

The gear wheel 21, which is rotatably supported by bearings 27 and 28 about the shaft 22 projecting downwards out of the gear box 16, has near the bottom side a circular, outwardly and downwardly inclined flange 29. The flange 29 partly supports a rotor 30. This rotor 30 comprises a top plate 31 which lies in a first conical plane, the apex of which is located on the center line 23 and the axis of which coincides with the center line 23. The complete vertex angle of this conical plane is in this embodiment about 150°. At the outer edge concentric with the center line 23 the top plate 31 changes into a peripheral plate 32 (FIGS. 5, 6), which lies in a second conical plane, the apex of which is also located on the center line 23, while the axis also coincides with said center line 23. The complete vertex angle of the second conical plane is about 75°. The vertices of the two conical planes are located above the top plate 31. The top plate 31 and the peripheral plate 32 are integral with one another. The peripheral plate 32 has a circular flange 33, to which is secured by means of bolts 34 a circular flange 35 of a screen in the form of a releasable suction wall 36. This suction wall 36 lies in a third conical plane, the whole vertex angle of which is about 75°, while its apex is located above the rotor 30 on the line 23 and the axis coincides again with the line 23. The suction wall 36 is outwardly and downwardly inclined away from the flange junction 33, 35. As an alternative the wall 36 may be shaped in the form of an approximately vertical cylinder or in the shape of a cone, the apex of which is located beneath the lower end of the shaft 22.

The suction wall 36 is curved throughout the periphery on the bottom side inwardly toward the interior and then curved in an upward inclined direction (FIGS. 5 and 6) and from this inward curved rim which is formed it terminates in an inner wall 37, which is located between the shaft 22 and the suction wall 36 and which lies in a fourth conical plane having a vertex angle of about 95°, the axis being again located on the center line 23, on which its apex also is located. The latter apex is located above the rotor 30. In the sectional view of FIG. 6 the suction wall 36 and the inner wall 37 are disposed at an angle opening upwardly relative to one another.

The suction wall 36 has throughout its periphery a large number of suction apertures 38. The diameter of each aperture 38 is two to twenty millimeters, preferably four to ten millimeters, dependent upon the nature of the stalks to be displaced and the distance between two adjacent apertures of the same order of magnitude. The distance between adjacent apertures 38, however, is irregular. The suction wall 36 is thus perforated throughout its periphery and these perforations extend from about the flange 35 to the curved portion between the suction wall 36 and the inner wall 37, this curved portion also having apertures center lines of which are about parallel to wall 37 and converge in centerline 23. The number of apertures per unit of surface is preferably greater near the bottom portion of the wall 36 and in the curved or bent portion than in the upper part of the wall 36. The wall 36 may, however, also be formed by a grating. In the embodiment illustrated, the inner wall 37 is not perforated, but it is possible to provide it with suction apertures under conditions depending upon the nature of the stalks to be displaced and upon the height of the rotor above the ground. The inner wall 37 is provided at its top and inner end with a flange 39, to which is fastened by means of bolts 40 a circular flange of a bottom plate 41. The bottom plate 41 lies in a fifth conical plane, the apex of which is again located on the center line 23, which coincides with the axis of the cone, thereby formed while the apex is located beneath the fastening area of the top plate 31 to the gear wheel 21. In the sectional view of FIG. 6 the top plate 31 and the bottom plate 41 diverge towards the center line 23 at an angle of about 5°. The bottom plate 41 terminates at a distance from the center line 23, which distance is about 30% of the radius of the outer circumference of the rotor 30 so that an opening is formed coaxially with the center line 23. On the bottom side of the bottom plate 41 are arranged a plurality—in this embodiment twenty-four—of blades 42 of sheet material, which are curved with respect to the direction of rotation B of the rotor 30 as shown in the plan view of FIG. 1. The blades are disposed, as shown in FIG. 1, with their ends nearest the shaft 22 tangential to a radial line and they bend away outwardly so that the angle between the tangential line and said radial line increases radially outwardly, while with respect to the direction of rotation B the blade is located behind the radial line. The acute angle of interception between line tangential to a blade 42 to the radially outermost point of the blade 42 and the radial line passing through the inner end of the same blade is in this embodiment about 45° to 50°. The blades 42 terminate at their outer edge at a distance from the center line 23 approximately equal to 85% of the radius of the outer circumference of the rotor 30 and also at a distance inside the flange 39. The webs 43 of the blades 42 are all secured on the bottom edge to a circular closing plate 44, which has an outer portion lying in a sixth conical plane, the vertex of which is located on the center line 23, while its axis coincides with the center 23; this plane is outwardly and downwardly inclined so that the outer portion of the closing plate 44 and the bottom plate 41, as shown in the sectional view of FIG. 6, diverge in the direction towards the center line 23 at an angle of about 5°. This outer portion of the closing plate 44 is joined by a central portion extending parallel to a plane at right angles to the center line 23. The circular transitional part under the opening defined by the interior edges of plate 41 between the outer portion and the central portion of plate 44 has a diameter approximately equal to that of such opening. The closing plate 44 is held by means of a bearing 45 on the shaft 22 near the lower end thereof. The plates 41 and 44 and the blades 42 constitute together an air displacing means in the form of a centrifugal fan.

Between the bottom side of the bearing 28 and the top side of the bearing 45 the shaft 22 is intimately surrounded by a sleeve 46, which has near the lower end of the shaft 22 diametrical bores through which a pin 47 extends, which pin 47 extends through a local bore in the shaft 22. The sleeve 46 is thus fixed in place relatively to the shaft 22 and does not rotate in operation. The lower edge of the sleeve 46 is supported by the inner ring of the bearing 45, whereas the top edge of the sleeve 46 engages the inner ring of the bearing 28.

The stationary sleeve 46 has secured thereto an air blocking member 48 covering only a given circumferential angle about the center line 23. The blocking member 48, the periphery of which is indicated by broken lines in FIG. 1, extends through an angle of about 120°, so that as shown in the plan view of FIG. 1, viewed in the direction of movement A, the quadrant on the left-hand bottom side of the rotor 30 is covered as well as an adjoining part of the quadrant on the left-hand top side and an adjoining part of the quadrant on the right-hand bottom side. As shown in the sectional view of FIGS. 4 and 6 the blocking member 48 is located between the top plate 31, the bottom plate 41, the peripheral plate 32, the foraminous suction wall 36 and the inner wall 37. The blocking plate is bounded on the top side by an upper boundary plate 49, secured to the sleeve 46 and close to the inner side of the top plate 31, leaving a very narrow gap, (it therefore has generally the same shape as the plate 31) and on the outer side it is bounded by a peripheral plate 50 joining the plate 49 and extending parallel to the rotatable peripheral plate 32 and to the foraminous suction wall 36 (a very narrow gap being left between the plate 50 and the two plates 32 and 36), while on the bottom side it is bounded by an inner rim 51 integral with the peripheral plate 50 and being parallel to the inner wall 37 at a short distance therefrom and by a lowermost boundary plate 52 connected to the inner rim 51 and being integral therewith and being located a short distance above the top side of the bottom plate 41, a very narrow gap being again left between the plates 52 and 41. The inner edge of the lower boundary plate 52 is secured to the sleeve 46. As shown in the sectional views of FIGS. 4 and 6, the plate portions 49, 50, 51 and 52 together with the sleeve 46 form a closed space. With respect to the whole space inside the top plate 31 and the bottom plate 41 of the rotor 30 the space enclosed by plate portions 49, 50, 51, 52 is preferably not closed; the radially extending boundary surfaces of the member 48 shown in FIG. 1 are open. Under some conditions it may be desirable for these radial boundaries of the member 48 to be wholly or partly closed. If desired the narrow gap between the member 48 and the bottom side of the top plate 31 as well as the narrow gap between the lower boundary plate 52 and the bottom plate 41 can be closed by flexible stuffing material.

The frame beam 12 is provided with two relatively spaced pivotal shafts 53 and 54, the center lines of which are in line with one another. A substantially U-shaped bracket 55 is freely pivotable about said pivotal shafts 53 and 54. The outer side of the U-shaped bracket 55 is located, viewed in the direction of movement A, at a distance beyond the outer circumference of the rotor 30. This outermost part of the bracket 55 is provided with a guide member 56 for the displaced stalks, which member 56 extends parallel to the intended direction of movement A and is approximately vertical during operation. As shown in FIG. 1 the prolongation of a boundary line of the blocking member 48 located in the left-hand upper quadrant of the rotor 30 intersects the guide member 56 at a place located in front of the center of the guide member 56, viewed in the direction of movement A.

Figure 2:
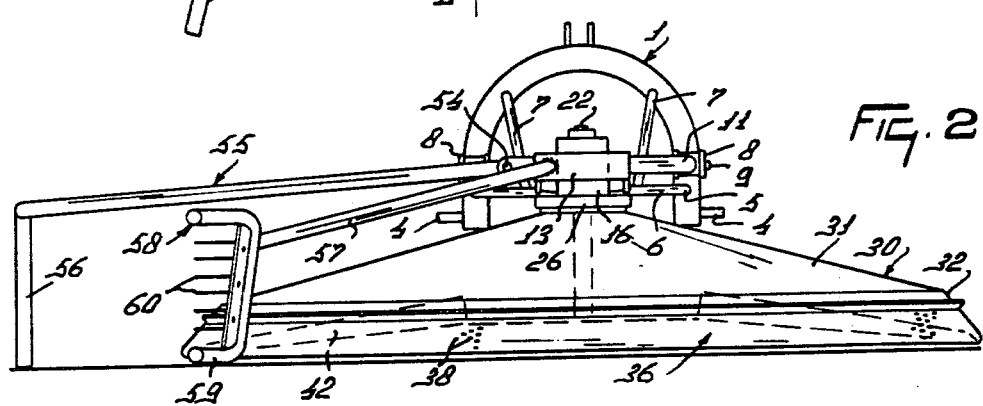
FIG. 2 shows the machine of FIG. 1 as viewed in the direction of the arrow II in FIG. 1.

To the tie member 13 is rigidly secured a holder 57, which extends to the rear, viewed in the intended direction of movement A, in an inclined position and as shown in FIG. 2 towards the projected length of the guide member 56. Viewed on plan the rear end of the holder 57 is located just outside the rotor 30 and is fastened to a second guide member 58, which is located behind the guide member 56, viewed from a side in an inclined position such that together with the first-mentioned guide member 56 it converges rearwardly. The two guide members 56 and 58 comprise a guide arrangement.

One of the two carrying rods 5, that is to say the rod located on the side of the guide member 56, is sharply bent outwardly towards the guide member 56, as is shown in FIG. 1, so that the lower side of the foremost limb of the bracket 55 can bear on the outwardly bent portion of the carrying rod 5.

The rotor 30 can be driven by means of the auxiliary shaft 19, connected with the input shaft 17. When the input shaft 17 is driven, the bevel gear wheel 20 and hence the gear wheel 21 are driven. Since the rotor 30 is connected with the flange 29 of the gear wheel 21, the rotor 30 will also be rotated, whereas the blocking member 48 and the sleeve 46 do not rotate. Since the blades 42 together with the plates 31, 32, 36, 37 and 41 will rotate simultaneously, the blades suck in air from the space between the plates 31, 32, 36, 37 and 41. The air flows away downwardly via the opening of the bottom plate 41 holding the shaft 22. Thus subatmospheric pressure is produced in the space between the plates 31 and 41, so that air enters through the apertures 38 provided round about in the suction wall 36 (arrow C in FIG. 5).

When the machine is moved in the direction A, the stalks and stems lying on the ground will be drawn by suction by the air flowing into the apertures 38 against the outer side of the wall 36, to which they will adhere temporarily, at a suction region, i.e. the region not covered by the blocking member 48. The stalks are carried along by the preferably smooth wall 36 in the direction of the arrow B until they arrive at a non-suction region, i.e. the region where the inner side of the wall 36 is screened by the blocking member 48. In this area defined by member 48, indicated by the broken lines in FIG. 1, no subatmospheric pressure is prevailing on the inner side of the wall so that no air enters through the apertures 38 and the stalks adhering to the wall 36 will be thrown off and be directed by the guide members 56 and 58 into a swath.

If large quantities of stalks have to be displaced per unit time, they are carried along by the rotor 30 so as to say in layers. This transport of the stalks lying on the ground in layers is performed in the direction of movement of the machine. The stalks lying nearest the wall 36 are drawn to said wall by the suction force and owing to the rotation of this wall they are immediately delivered so that the next stalks are attracted towards the wall portion 36 turning towards these stalks and not yet being covered with stalks. Therefore, the speed of rotation of the rotor 30 is to some extent determined by the quantities of stalks to be picked up per unit time.

Since a narrow and long gap is left between the blocking member 48, which does not rotate in operation, and the rotating walls 31, 32, 36, 37 and 41, the quantity of air sucked in through the apertures 38 covered by the peripheral plate 50 is very small so that no stalks or stems are attracted towards this covered wall portion.

The quantity of air sucked through the apertures 38 is pushed outwardly (arrow D in FIG. 6) by the centrifugal fan formed by the blades 42, the bottom plate 41 and the closing plate 44 and is discharged through the annular opening bounded by the outer edge of the closing plate 44 and the flange 39. This downwardly emerging air produces beneath the rotor 30 excess pressure or an air cushion, which supports the weight of the whole rotor 30, the guide members 56 and 58, the driving gear of the gear box 16 and the frame beams 11 and 12. Since the rotor 30 is freely pivotable about the pivotal shaft 15, it can rise and fall to match the local conditions of the ground. In operation the frame beams 11 and 12 are freely movable above the carrying rods 5, which form a lifting device of the machine, and above the tie beam 6, which are rigidly secured to the trestle 1 and hence to the lifting device of the tractor 3. Thus the rotor 30 is freely movable in a vertical direction and, moreover, about a transverse axis (pivotal shafts 15).

The guide member 58, which is rigidly held in place with respect to the frame beams 11 and 12, may be employed as a stabilizing member for the vertical adjustment of the rotor 30. The guide member 58 may be provided, at least on its bottom side, with a support 59, which can bear on the ground and is formed in this embodiment by a tube of circular cross-section.

Figure 3:
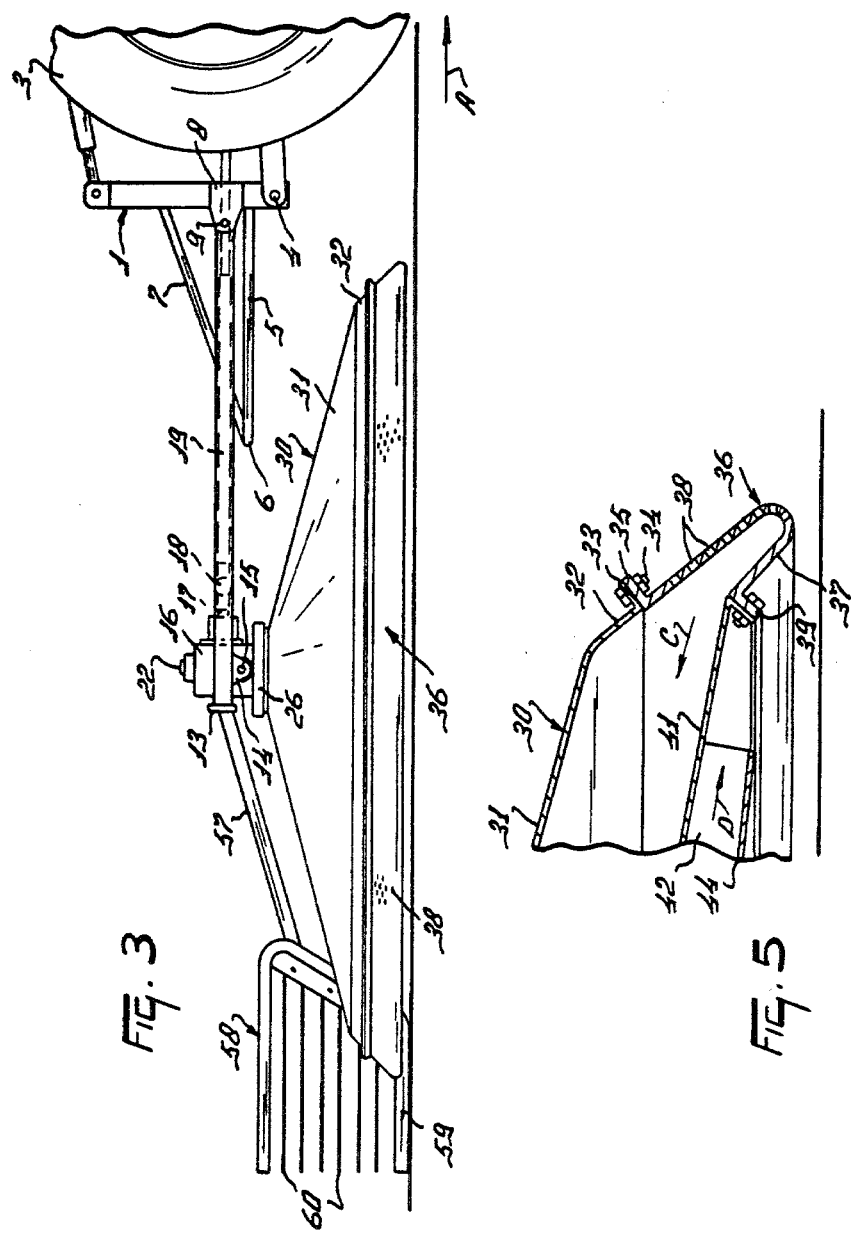
FIG. 3 is a side elevation of the machine of FIG. 1 viewed in the direction of the arrow III in FIG. 1.
Figure 4:
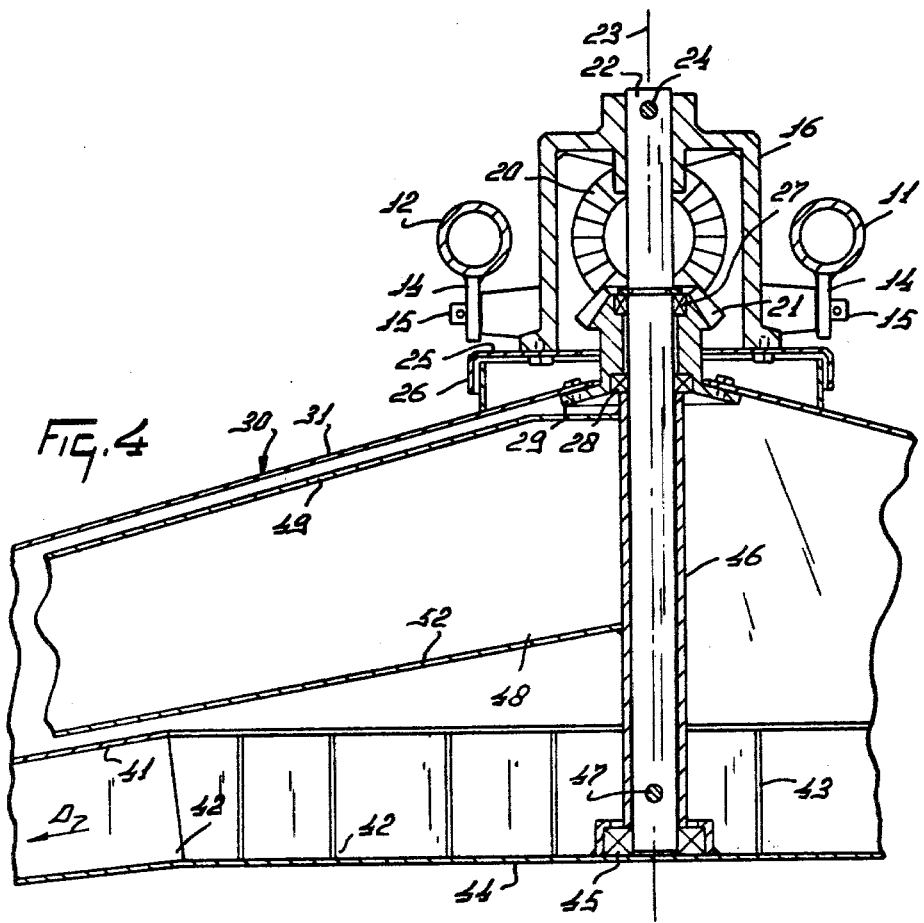
FIG. 4 is a sectional view taken on the lines IV—IV in FIG. 1.
Figure 6:
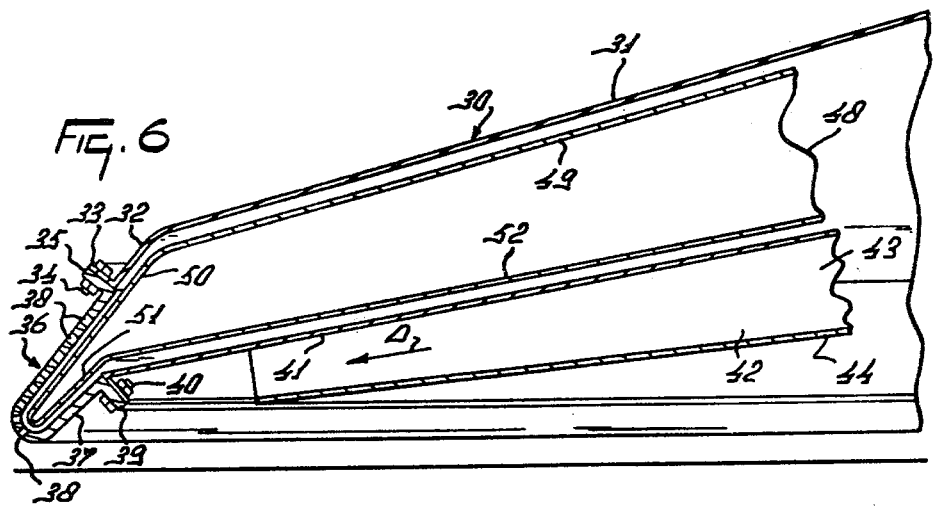
FIG. 6 is a sectional view taken on the lines VI—VI in FIG. 1.

The circular bottom wall of the rotor 30 is located, owing to the air cushion beneath the rotor, at a distance above the ground preferably approximately at the level of the top of the stubble. The air displaced by the blades 42 emerges through the gap beneath the curved plate portion between the plate portions 36 and 37 and has the effect of loosening the stalks lying among the stubbles. The stalks move towards the suction wall 36 owing to the air being drawn through the apertures 38 above the area where the air emerges from the bottom side of the rotor 30, while a portion of this emerging air will practically immediately enter through the apertures 38 and draw stalks against the suction wall 36. It may be desirable to prolong the guide member 58 from that part of the guide member 58 which is nearest the circumference of the wall 36 and along the part of the wall circumference covered by the closing member 48 to screen the gap between the lower edge of the rotor 30 and the ground in order to prevent the air flowing out beneath the rotor from adversely affecting the swath formed. For this purpose, for example, the support 59 may be prolonged along that part of the lower edge of the rotor 30 along which the wall 36 is screened by the blocking member 48. As shown in FIGS. 2 and 3 the guide member 58 is provided with a plurality of guide rods 60, lying one above the other and extending freely to the rear in order to form a correct swath, but as an alternative the guide member 58 may have a completely closed surface in order to prevent the air emerging from the bottom side of the rotor 30 from adversely affecting the swath formed. It should be noted that the rotor 30 is not tiltable about an axis parallel to the direction of movement A with respect to the tractor 3 owing to the nature of the fastening structure on the lifting device of the tractor.

As stated above, the rotor 30 is freely movable in a vertical direction with respect to the lifting device of the tractor, since the dimensions are chosen so that in operation the carrying rods 5 are disengaged from the frame arms 11 and 12 and are located at a distance beneath the frame arms 11 and 12. If the machine has to be lifted, the lifting device of the tractor 3 is raised until the carrying rods 5 engage the lower sides of the frame beams 11 and 12, which are thus carried along upwardly. The carrying rods 5 and the tie beams 6 constitute a lifting device associated with the machine itself, which can be actuated by the lifting device of the tractor 3. The bracket 55 supporting the guide member 56 is also carried upwardly by one of the two carrying rods 5, which is bent outwardly for this purpose, for example, in making a curve on the field. During transport the bracket 55 together with the member 56 is tilted about the pivotal shafts 53 and 54 so that the width of the machine during transport is reduced.

Figure 7:
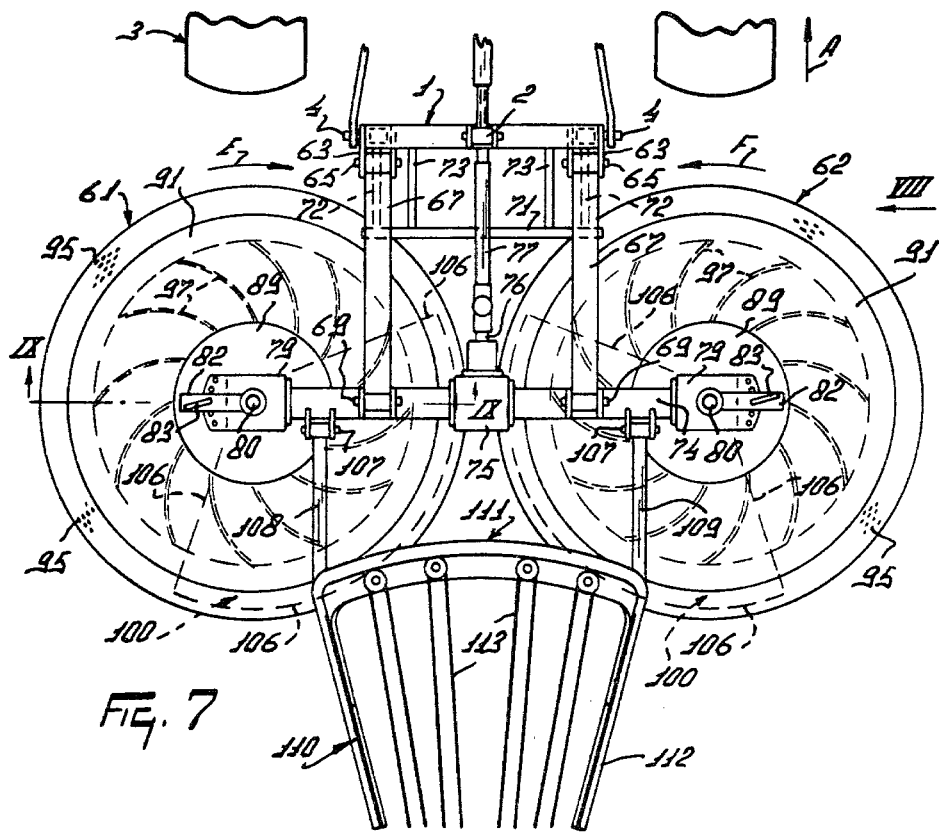
FIG. 7 is a plan view of a second embodiment of a machine in accordance with the invention.
Figure 8:
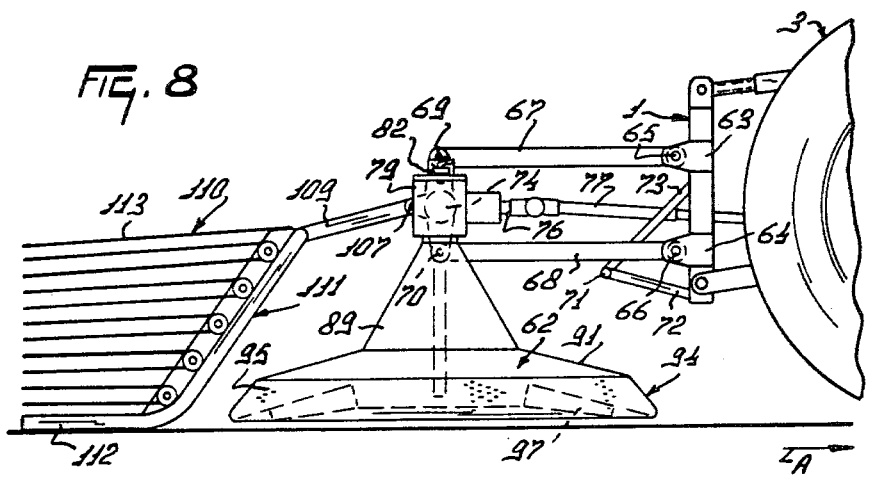
FIG. 8 is a side elevation of the machine shown in FIG. 7 as viewed in the direction of the arrow VIII in FIG. 7.

A second embodiment of the machine in accordance with the invention is shown in FIGS. 7 to 9. This machine comprises two rotors 61 and 62, disposed side by side and adapted to rotate about upwardly extending axes in opposite senses E and F so that the adjacent sides of the rotors move to the rear. On either side the trestle 1 formed in the shape of an inverted U is provided with tags 63 and 64 (FIG. 8) located at a distance one above the other. The tags 63 and 64 hold near their rear ends horizontal pivotal shafts 65 and 66 respectively, extending transversely of the intended direction of travel and having connected to them freely pivtoable rods 67 and 68 respectively, which are constantly parallel to one another, since they are connected near their rear ends with horizontal pivotal shafts 69 and 70 respectively, extending transversely of the direction of movement A and being spaced apart by the same distance as the pivotal shafts 65 and 66. Viewed from a side, the line of connection between the pivotal shafts 69 and 70 is parallel to the line of connection between the pivotal shafts 65 and 66 so that the rods 67 and 68 afford links of a freely pivotable parallelogram linkage. Such a construction is arranged symmetrically to a vertical plane of symmetry of the machine parallel to the direction of movement. A lifting device, which again is rigidly connected to trestle 1, comprises a carrying rod 71, which is located at a distance behind the trestle 1 and which extends horizontally and transversely of the direction of movement A. The width of the carrying rod 71 is such that it extends beneath the lower rods 68 at a level such that in operation the rod 71 is disengaged from the rods 68 and is located at a distance beneath the rods 68. By means of supporting tubes 72 and 73 the carrying rod 71 is rigidly secured to the trestle 1 and viewed in plan a supporting tube 72 is located beneath each of the rods 68 and is inclined downwardly and forwardly from the carrying rod 71, while also viewed in plan the two supporting tubes 73 are located between the rods 68 and are inclined upwardly and forwardly towards the trestle 1.

The pivotal shafts 69 and 70 on the rear ends of the two pairs of rods 67 and 68 are connected with the top side and the bottom side respectively of a horizontal frame beam 74, extending transversely of the direction of movement A and supporting near its ends the rotors 61 and 62. The frame beam 74 is provided at the center with a gear box 75 which is arranged symmetrically with respect to the vertical plane of symmetry of the machine in the direction of movement A, said gear box having an input shaft 76, with which can be connected an auxiliary shaft 77 to be driven by the tractor 3. The rotors 61 and 62 are driven from the gear box 75 via driving shafts 78 (FIG. 9), which are located inside the hollow frame beam 74. Near each end of the frame beam 74 is a gear box 79 that supports a shaft 80, which is stationary during operation and which is then approximately vertical and emerges from the bottom side of the gear box 79. Near the top end projecting over a small distance out of the top side of the gear box 79 the shaft 80 is rigidly secured by means of a pin 81 to a lever 82, by means of which the shaft 80 can be turned with respect to the gear box 79, it being fixed in various positions by means of a locking pin 83.

A bevel gear wheel 84 fastened to the driving shaft 78 and arranged inside the gear box 79 is in mesh with a bevel gear wheel 85, which is rotatably supported by means of two bearings 86 and 87 relative to the shaft 80. The bevel gear wheel 85 is provided with a circular, downwardly extending flange 88 inclined outwardly, to which is secured a supporting element 89 of sheet material, having a surface which lies in a first conical plane, the vertex of which is located on the center line 90 of the shaft 80, while the axis coincides with said center line 90. The lower circular boundary edge of the supporting element 89, located at a distance from the shaft 80, has secured thereto a circular top plate 91, the surface of which lies in a second conical plane having its vertex located on the center line 90 and its axis coinciding with said center line. The vertex of the second conical plane is located above the material of the top plate 91. The top plate 91 extends inside the supporting element 89 (to near the shaft 80) and outside the lower boundary edge of the supporting element 89. The sectional view of FIG. 9 shows that the supporting element 89 is fastened to the top plate 91 approximately midway across the surface thereof. At the shaft 80 the top plate 91 is fastened to the outer ring of a bearing 92, which is located near the vertex of the conical plane of plate 91, which is thus allowed to rotate relatively to the shaft 80. The plate 91 is furthermore connected with a sleeve 93 extending between the lower side of the bearing 87 and the top side of the bearing 92 and being coaxial with the shaft 80. Near its outer periphery the top plate 91 changes into a downwardly bent-over circular suction wall 94 affording a screen, the surface of which lies in a third conical plane, the vertex of which is located on the center line 90 and the axis of which coincides with said center line 90. The shape of the conical plate 91 and wall 94 is approximately equal to that of the corresponding parts in the first embodiment. Throughout its height and its circumference the suction wall 94 is perforated by a large number of apertures 95, which are also made in an inward curved portion terminating in a circular bottom plate 96, the surface of which is approximately parallel to that of the top plate 91. The bottom plate 96 terminates at a distance from the shaft 80 so that the inner boundary edge of the conical plate 96 leaves an opening around the shaft 80, the diameter of which is about 30% of the outer diameter of the rotor 61 itself. On the bottom side of the plate 96 a large number of blades 97 are provided, whose shape is similar to that of the blades 42 of the first embodiment with respect to the center line 90 and to the direction or rotation E and F respectively. The passages between the blades 97 are closed on the bottom side by a closing plate 98, an outer portion of which is conical so that the upper and lower boundaries of the space between said portion of the closing plate 98 and the bottom plate 96 converge outwardly. The sectional view of FIG. 9 shows that the outer portion of the closing plate 98 and the bottom plate 96 are at an angle of about 5° to one another. The central portion of the closing plate 98 is at right angles to the center line 90, passes beneath the lower end of the shaft 80 and closes the rotor at the center. The outer edge of the closing plate 98 is at a distance from the center line 90 approximately equal to 75% of the outer circumference of the rotor 61 or 62 respectively.

The lower side of the inner ring of the bearing 92 is in contact with a sleeve 99, which intimately surrounds the lower end of the shaft 80 and which has an air blocking member 100 rigidly secured to it. The member 100 and the sleeve 99 are firmly secured to the shaft 80. The blocking member 100 comprises an upper closing plate 103 spaced with a very small clearance from the lower side of the top plate 91, the outer edge terminating in a non-perforated peripheral plate 104, which is spaced from the inner side of the perforated suction wall 94 with a small clearance. The lower and outer edge of the peripheral plate 104 joins a lower boundary plate 105, which is spaced from the top side of the bottom plate 96 with a small clearance. The plates 103, 104 and 105 cover only part of the circumference of the rotor and are bounded, viewed on plan, by the broken lines 106 in FIG. 7. The inner edges of the boundary plates 103 and 105 are secured to the sleeve 99. The radial boundary surfaces of the blocking members 100 designated in FIG. 7 by reference numeral 106 need not be closed; they may as an alternative be wholly or partly closed (near the suction wall 94). The blocking members 100 of the rotors 61 and 62 extend, as is shown in FIG. 7, inside the parts of the rotors which face one another and partly across the rear sides of the rotors.

Near the two gear boxes 79 the frame beam 74 is provided with aligned pivotal shaft 107, to which rearwardly extending supports 108 and 109 are fastened so as to be freely pivotable. The rear ends of the supports 108 and 109 are provided with a swath basket 110, which bears on the ground during operation and which has an extrance with a width which is approximately equal to 75% of the diameter of one of the rotors. The swath basket is disposed symmetrically with respect to the vertical plane of symmetry parallel to the direction of movement A. Viewed on plan the smallest distance between the adjacent edges of the rotors 61 and 62 is approximately equal to 5% to 15% of the diameter of one of the rotors, preferably about 10% of said diameter. The swath basket 110 comprises a bracket 111 limiting the entrance on the sides and on the top and terminating on the bottom side in sliding rods 112 (FIG. 8), bearing on the ground during operation. The bracket 111 is provided with guide rods 113 extending freely to the rear, which smooth the swath formed during the movement of the machine.

In operation, each of the two specularly identical rotors 61 and 62 is driven via the auxiliary shaft 77, the gear box 75, the drieving shaft 78, the bevel gear wheels 84 and 85 and the supporting element 89. The sleeve 93, which is rigidly secured to the top plate 91, will also rotate during operation. The air displacing means of each of the rotors, formed by the bottom plate 96 fastened to the plates 91 and 94, the blades 97 and the closing plate 98, acts as a centrifugal fan to displace the air outwardly in the direction of the arrow G in FIG. 9. This air is sucked in through the opening bounded by the inner edge of the bottom plate 96 and it enters through the apertures 95 in the suction region of the suction wall 94 into the space bounded by the plates 91, 95 and 96, in which space subatmospheric pressure is produced by the air displacer. This air travels in the direction of the arrows H, J and G in FIG. 9. During the movement of the machine in the direction A the crop lying on the ground and encountered by the front sides of the suction walls 94 of the two rotors 61 and 62 is attracted by suction to the outer sides of said suction walls 94, the stalks being carried by the walls 94 in the direction of rotation E and F respectively towards the region between the two rotors 61 and 62. At the non-suction region between the two rotors the subatmospheric pressure prevailing inside the suction walls 94 disappears because the peripheral plate 104 of the blocking member 100 of the relevant rotor appears behind the rear side of the rotating suction wall 94 so that the stalks adhering to the wall 94 are ejected away from said wall and thus arrive into the swath basket 110.

The air displaced by the blades 97 generates excess pressure beneath each of the two rotors, so that the rotors and the associated frame parts and driving gear can be supported by said air. The displaced air emerges through the gap formed between the outer and lower edges of the rotors and the ground, while the stalks loosened by this emerging air are attracted to the suction wall 94 above said emerging air layer.

The orientation of the area over which the blocking members 100 cover the suction wall 94 of the associated rotor can be adjusted by loosening the locking pin 83 and by turning the lever 82 about the center line 90 until the desired orientation is reached, after which the locking pin is re-inserted. In this manner the place of release of the crop from the rotors can be adjusted to suit the nature of the stalks. The blocking members 100 can be turned in the directions E and F respectively to an extent such that the crop is tedded, i.e. is spread over a large width. During this tedding operation the swath basket 110 is put out of operation by turning it upwards about the pivotal shafts 107. Also the first embodiment may be employed in this manner.

The two rotors are in common movable with respect to the lifting device of the tractor 3 in a manner such that the center lines 90 of the two rotors constantly remain parallel to themselves and vertical owing to the attachment by means of the parallelogram linkage, the corners of which are formed by the pivotal shafts 65, 66, 69 and 70. The rotors bearing on the air cushion can, therefore, freely match the conditions of the ground, the swath basket 110, however, bearing constantly on the ground. It will be obvious that instead of the swath basket 110 two guide walls secured to the supports 108 and 109 respectively may be employed, which are separately movable with respect to one another and to frame beam 74 in a vertical direction.

Owing to the attachment to the lifting device of the tractor by means of the two parallelogram linkage the rotors cannot tilt with respect to the tractor about a horizontal axis parallel to the direction of movement A.

If during operation the machine is to be lifted, the trestle 1 is elevated so that the carrying rod 71 forming a lifting member will engage the lower side of the two lower rods 68, the two rotors being then lifted from the ground, the center lines 90 remaining, however, parallel to one another and substantially vertical.

In a third embodiment (FIGS. 10 to 12) two rearwardly extending frame beams 114 and 115 are rigidly secured to the rear side of the trestle 1. The rear ends of the beams 114 and 115 are rigidly secured to the horizontal frame beam 74, extending transversely of the direction of movement A and being provided at the center with a gear box 75, having an input shaft 76 driven via an auxiliary shaft 77. Component parts corresponding in place and function with those of the preceding embodiment are designated by the same reference numerals. The driving shaft 78 (FIG. 12) is provided at its end located inside the gear box 79 with a bevel gear wheel 116. In the gear box 79 is fastened a shaft 117, which does not rotate in operation and the center line of which is designated by 118. The gear wheel 116 is in mesh with a bevel gear wheel 119, which is rotatable about the shaft 117 by means of two bearings 120 and 121 spaced apart in upward direction. A donwardly extending, circular flange 122 of the gear wheel 119 is provided with an annular top plate 123, which is coaxial with the center line 118 and which is parallel to a plane at right angles to the center line 118. The lower side of the top plate 123 is provided with a great number of blades 124, the shape of which, viewed on plan, is identical to that of the blades 42 and 97 of the preceding embodiments. The blades 124 also terminate at a distance from the shaft 117 so that centrally of the blade assembly a flow opening is left for the air around the shaft 117. The blades 124 are supported on their bottom edges by a bottom plate 125, which has an annular shape and has the same outer diameter as the top plate 123 and an opening at the center equal in size to the aforesaid air flow opening. Near the inner edge the bottom plate 125 has fastened thereto a downwardly extending upper rotor plate 126, the surface of which lies in a first conical plane having its vertex located on the center line 118 and its axis coinciding with said center line. The imaginary vertex of the cone formed by the outer surface of the plate 126 is approximately located at the level of the bearing 121. the vertex of the cone defines an angle which is about 120°. The rotor plate 126 is inclined downwardly and outwardly away from the inner wall of the bottom plate 125 and changes near its lower edge in a downward direction into a circular peripheral plate portion 127 having a large number of apertures 128 throughout the height and the circumference, the size and the intervals of said apertures being identical to those of the first embodiment. The peripheral plate portion 127 has a conical surface, the vertex of the cone being again located on the center line 118, while the axis coincides with said center line 118. The vertex defines an angle which is about 70°. The lower edge of the plate 127 is bent inwardly throughout the circumference and terminates in a lower rotor plate 129 located at a distance beneath the plare 126, to which it is about parallel, the space left between the two plates 126 and 129 slightly converging towards its circumference. The inwardly bent—lower portion of the peripheral plate portion 127 also has apertures 128 up to its transition to the plate 129. The inner edge of the plate 129 is fastened near the shaft 117 to the outer ring of a bearing 130. Between the lower side of the inner ring of the bearing 121 and the top side of the inner ring of the bearing 130 a sleeve 131 closely surrounds the shaft 117 and is rigidly secured to the shaft 117 by means of a pin 132 passed diametrically through the shaft 117. The sleeve 131 has firmly secured thereto an air blocking member 133 having an upper boundary plate 134, which is spaced with a small clearance from the inner side side of the plate 126. The plate 134 changes into a a peripheral portion 135, which is parallel to the peripheral plate portion 127 at a small distance therefrom and which has on the lower side an inwardly curved transitional portion engaging a lower boundary plate 136, which is located at a very small distance above the top surface of the lower rotor plate 129, the inner edge being secured to the sleeve 131. Viewed on plan (FIG. 10) the boundary lines of the blocking member 133 are indicated by broken lines bearing the same reference numeral. The radial boundary surfaces of the member 133 may be open or wholly or partly closed as in the preceding embodiment.

A sleeve 137 is freely rotatable about the portion of the shaft 117 located beneath the bearing 130, the sleeve 137 being supported by a pin 138 passed diametrically through the shaft 117. On either side of the sleeve 137 wheel carriers 139 are symmetrically arranged, in which a ground wheel 140 is rotatably journalled. Viewed in the direction of movement A in operation the wheel carriers 139 extend rearwardly (FIG. 1), since the gound wheel 140 is a caster wheel. The ground wheel 140 is located at least mainly beneath the hindmost half of the associated rotor. The lower side of the gear box 79 has secured thereto a top plate 141 of a pump shell 142 surrounding an air displacing means in the form of a centrifugal fan 123, 124, 125. The top plate 141 is provided at its outer edge, which is not coaxial with the center line 118, with a sidewall 143 extending parallel to the center line 118, while the lower side of the sidewall 143 has fastened to it a bottom plate 144, which is located at least with a slight amount of clearance beneath the lower plate 125 of the fan 123, 124, 125, while an inner boundary edge, which is circular and coaxial with the line 118 is located at a short distance from the fastening area of the upper rotor plate 126 to the lower plate 125. Viewed in a direction of the relatively opposite rotary senses E and F of the two rotors the cross section of the pump shell 142 between the walls 141, 143, 144 and the outer boundaries of the blades 124 progressively widens from a point located beneath the frame beam 74 in the directions of rotation E and F up to a delivery opening 145, where said cross-section has its greatest value. The air displaced by the fan is discharged in the directions K and L respectively (FIG. 10) to the rear, said directions converging to the rear. The delivery openings 145 are located adjacent the vertical longitudinal plane of symmetry of the machine between the rotors and parallel to the direction of movement A.

In a vertical direction the delivery openings 145 are located so that the emerging air is blown out towards the swath basket 110 or between two separate guide walls for the crop.

In operation the fan 123, 124, 125 is driven via the driving shaft 78 and the gear wheels 116 and 119 so that the members displacing the stalks comprising the plates 126, 127 and 129 are caused to rotate, since the upper rotor plate 126 is rigidly secured to the air displacer. The air sucked in by the air displacer 123, 124, 125 through the central opening of the plate 125 produces subatmospheric pressure in the housing of the rotor so that air is sucked in through the apertures 128 at the suction region. Contrary to the preceding embodiments the air displacer is arranged here above the rotor proper. If the machine is moved in the directin A, the stalks located on the ground in front of the foremost portions of the two rotors are sucked towards the perforated peripheral plate 127 and carried in the directions of rotation E and F respectively inwardly between the rwo rotors. Like in the preceding embodiments the crop is carried in layers, since the stalks attracted towards the peripheral plates 127 are immediately displaced in the direction of rotation of the rotors and new openings not covered with stalks become available for attracting new stalks (these attractions of stalks in layers occur in the direction of movement A). Since the transitional portion between the peripheral plate 127 and the lower rotor plate 129 is also perforated, stalks lying among the stubbles are loosened and picked up. The stalks displaced in the directions E and F get between the two rotors into a non-suction region where the rear side of the stalk-carrying portion of the peripheral plate 127 is covered by the corresponding air blocking member 133 so that the stalks are released and travel in a relative sense towards the swath basket 110. Since the blocking member 133 covers a comparatively large circumferential angle of the associated rotor, it is always ensured that the stalks are released at places from where the crop can be thrown into the swath basket 110. By turning the blocking member 133 farther in the directions E and F respectively by means of the adjusting member 82, 83 the crop can be tedded, when the swath basket 110 is put out of operation by turning the shafts 107 upwardly. The air displaced by the air displacer is collected on the inner side of the sidewall 143 of the pump sheel 142 and is pushed in the directions E and F through a flaring cross-section and the delivery openings 145 in the directions K and L, said air stream contributing to densification of the stalks thrown into the swath basket 110, which preferably has rearwardly converging boundary walls. As a matter of course, as an alternative the ground wheel 140 may be adjustable in a vertical direction and fixable in a plurality of positions so that the height of the lower edge of the peripheral plate 127 above the ground can be adapted to the nature of the crop to be picked up.

Despite the rigid connection of the frame beams 114 and 115 the machine can move freely up and down with the trestle 1, when the lifting device of the tractor 3 is released, while the swath basket 110 or two separately movable guide walls can freely match the unevennesses.

Figure 13:
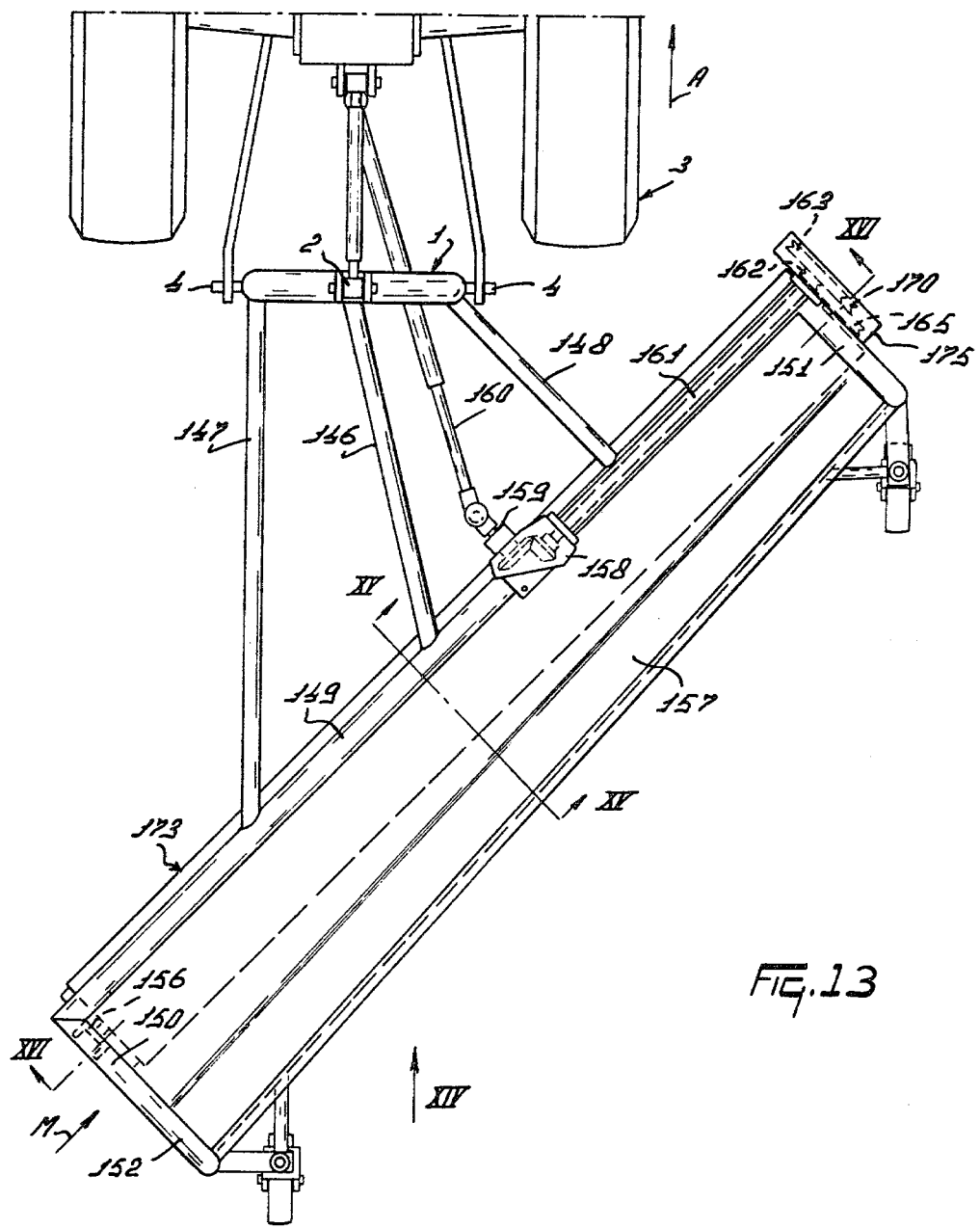
FIG. 13 is a plan view of a fourth embodiment of a machine in accordance with the invention.
Figure 14:
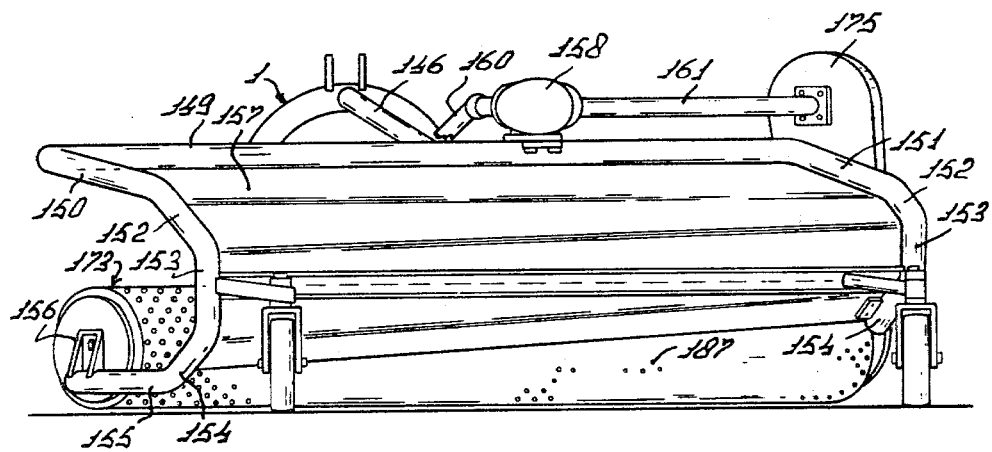
FIG. 14 is a rear view of the machine shown in FIG. 13 taken in the direction of the arrow XIV in FIG. 13.
Figure 15:
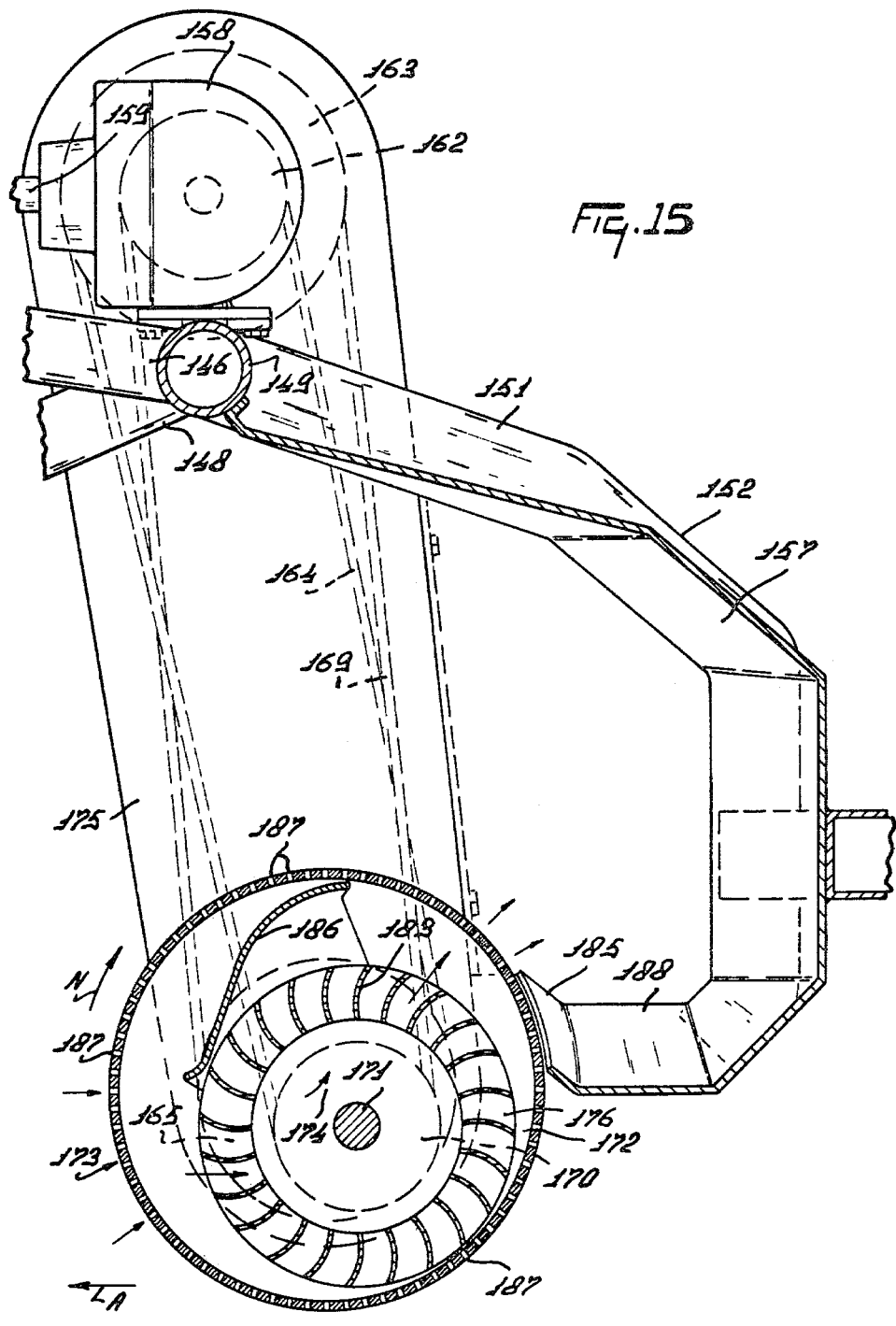
FIG. 15 is a sectional view taken on the lines XV—XV in FIG. 13.
Figure 16:
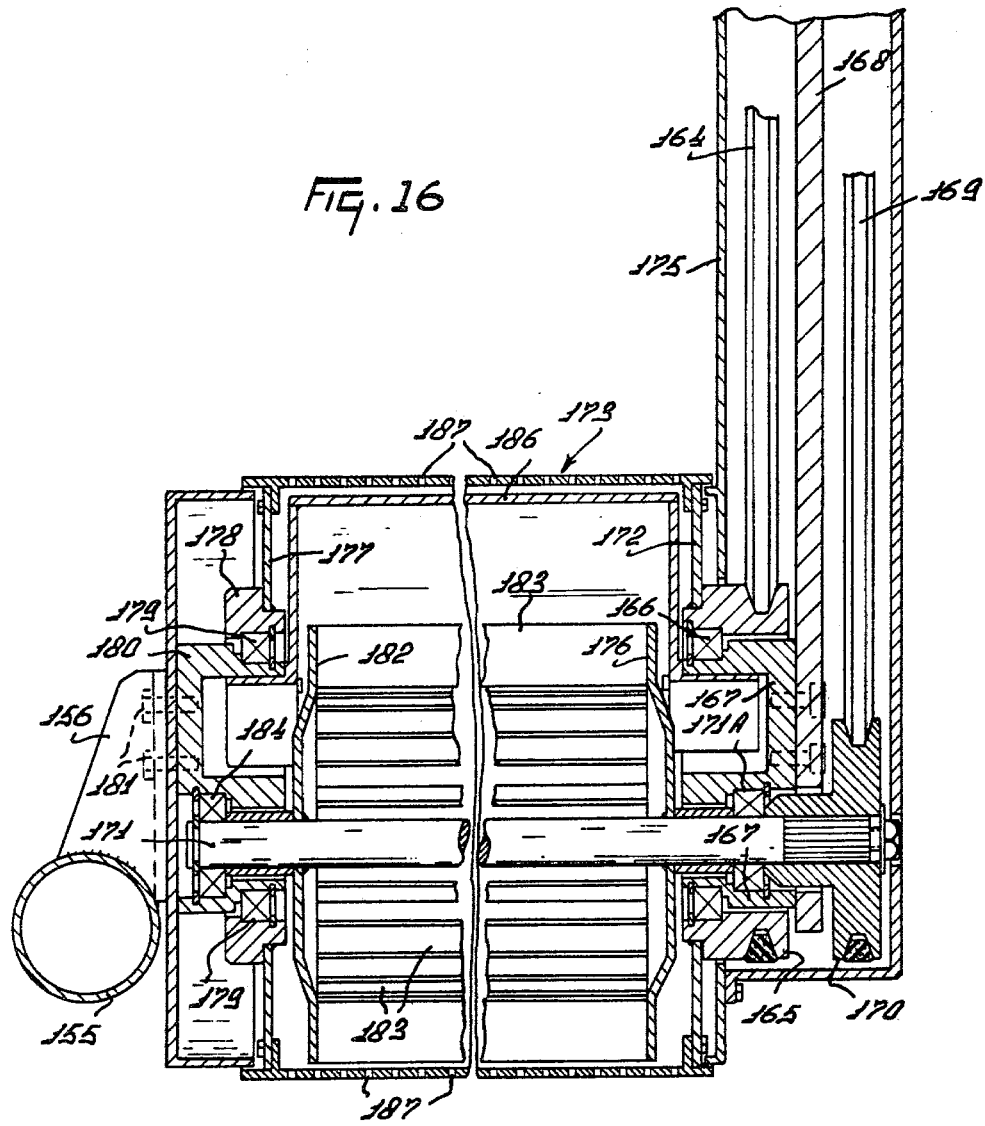
FIG. 16 is a sectional view taken on the lines XVI—XVI in FIG. 13.

In a further embodiment the trestle 1 is provided with three supporting rods, a supporting rod 146 being secured near the fastening member 2 to the top side of the trestle 1 and being inclined downwardly and laterally to the rear (FIG. 13), a supporting rod 147 being inclined, near one of the lower ends of the trestle 1, to the rear and in upward direction and a third supporting rod 148 being inclined, near the other end of the trestle 1, to one side and in upward direction. These supporting rods 146 to 148 are disposed so that their ends can be secured to a frame beam 149, which is at an angle of about 45° to the direction of movement A as shown in the plan view of FIG. 13. The frame beam 149 is provided at both ends with laterally and rearwardly inclined side beams 150 and 151 respectively, which join at their rear edges downwardly bent beam portions 152, adjoining approximately vertical beam portions 153, adjoining forwardly and downwardly inclined frame portions 154 and adjoining forwardly inclined, horizontal end portions 155. The assembly of beam portions 150, 152, 153, 154 and 155 and the assembly of the corresponding beam portions 151, 152, 153, 154 and 155 at the other end of the frame beam 140 are located, viewed on plan, parallel to a vertical plane at an angle of about 45° to the direction of movement A (FIG. 13). The end portion 155, located farthest to the rear of the machine, is provided near its end with a bearing support 156 (FIG. 14). A sharply bent plate construction 157 extending the entire length of the machine and having a shape corresponding with that of the beams 150 to 155 is arranged between the frame beam 149 and the two opposite side beam portions 150 and 151 and between the beam portions 152, 153 and 154, fastened to the two ends of the beam 149. The top side of the frame beam 149 is provided with a gear box 158 having an input shaft 159, with which can be connected a drive shaft 160 to be driven by the tractor. An output shaft of said gear box 158 is coupled by means of a driving shaft held in a tube 161 extending parallel to the beam 149 with two pulleys 162 and 163 located side by side and adapted to rotate about the same axis. A driving belt 164 passed around the pulley 162 is also passed around a pulley 165, which is adapted to rotate about a bearing 166, which is held in a support 167. The support 167 is rigidly secured to a supporting plate 168 arranged between the side beams 151 and 155 near the foremost end of the machine, viewed in the direction of movement A. The plate 168 also engages the beam portions 152, 153, 154 and 155 joining the side beam 151. A driving belt 169 is passed around the larger pulley 163 located at the side of and obliquely in front of the pulley 162. The driving belt 169 is passed on the bottom side around a pulley 170, which is rigidly secured by means of a series of inner key ways to a horizontal shaft 171, which is viewed in plan approximately parallel to the direction of length of the frame beam 149. The pulley 170 is journalled by means of a bearing 171A in the support 167, which also holds the pulley 165. The pulley 165 is provided with a closed end partition 172, which has an annular shape and is coaxial with the pulley 165. To the periphery of the end partition 172 is secured a hollow cylinder 173, which is coaxial with the outer periphery of the bearing 166. The comparatively long cylinder 173 extends in a direction of length approximately parallel to the direction of length of the beam 149 and covers substantially the whole distance between the side beams 150 and 151. The center line of the cylinder 173 is designated by reference numeral 174 in FIG. 15. The construction of the pulley drive at the front end of the machine, surrounded by a screening casing 175 is such that the center line of the shaft 171 extending parallel to the center line 174 is located, viewed in the direction of the arrow M (FIG. 13) and with respect to the direction of movement A obliquely behind and beneath the center line 174 (FIG. 15). Near the support 167 the shaft 171 is provided with a closed end partition 176, which is coaxial with the center line of the shaft 171. At the end remote from the screening casing 175 the cylinder 173 is held by a closed end partition 177, which has an annular shape and has its inner edge secured to a hub 178, which is rotatable by means of a bearing 179 about a support 180, which is fastened by means of bolts 181 to the bearing support 156.

Near the support 180 the shaft 171 is provided with a second end partition 182 of the same size as the end partition 176 located near the other end of the shaft 171. Between the end partitions 176 and 182 are arranged a great number of curved blades 183, for example twenty-four blades, of a size such that the boundary lines facing the shaft 171 define a space around the shaft 171, the diameter of which space is about 60 to 70% of the diameter of the space defined by the outer boundary lines of the blades 183 parallel to the shaft 171. The location of the shaft 171 with respect to the center line 174 of the cylinder 173 and the largest diameter of the air displacing means formed by the blades 183 are chosen so that, viewed in the direction of the arrow M, the outer periphery of the air displacing means formed by the blades 183 nearly touches the inner wall of the cylinder 173 at a place in line with the line of connection between the center line 174 and the center line of the shaft 171 (FIG. 15).

The shaft 171 is supported by means of a bearing 184 on the same support 180 as that holding the cylinder 173.

The portion of the plate construction 157 located between the two end portions 155 is provided near the outer circumference of the cylinder with a connecting piece 185 extending the entire length of the cylinder 173, the boundary edge facing the cylinder engaging the cylinder 173 with a very slight amount of clearance, whilst said end is orientated opposite the direction of rotation N of the cylinder 173 and serves as a scraper. A closed blocking plate 186 is arranged between the inner side of the cylinder 173 and the outer circumference of the air displacing means formed by the blades 183. The blocking plate 186 is arranged in the region located, as shown in FIG. 15, with respect to the direction of movement A, on either side of the forwardly prolonged line of connection between the center line 174 and the center line of the shaft 171. The blocking plate 186 has a curved shape as shown in FIG. 15. The lowerside of said plate engages the outer circumference of the air displacing means, whereas the top side of said plate nearly touches the inner side of the cylinder 173. The plate 186 also covers the whole axial length of the cylinder 173.

The cylinder 173 has perforation in the form of apertures 187 throughout its circumference and its length and thus affords an air-permeable screen. The diameters and the intervals between the apertures 187 correspond with those of the peripheral plates in the preceding embodiments.

The plate construction 157 is shaped so that the portions located between the frame portions 154 at the ends of the machine and between the end portions 155 extend in the direction of length of the cylinder 173 and are inclined downwardly and rearwardly, viewed in the direction of movement, as is shown in FIG. 14. For this purpose the beam portions 152 and 153 located at the front of the machine are shorter than the beam portions 152 and 153 at the rear of the machine. A portion 188 (FIG. 15) of the plate construction 157 is thus inclined downwardly and rearwardly, viewed in a direction parallel to the shaft 171. The further portions of the plate construction 157 are shaped so that with respect to the center line 174 of the cylinder 173 and viewed parallel to said center line 174 said portions diverge to the rear as will be apparent from FIGS. 13 and 15.

In operation both the cylinder 173 and the air displacing means comprising the blades 183 are driven in the direction N. Through the auxiliary shaft 160, the input shaft 159, the gears of the gear box 158 and the driving shaft located in the tube 161 the pulleys 162 and 163 are driven and hence via the belts 164 and 169 the pulleys 165 and 170 respectively, which drive the cylinder 173 and the air displacing means formed by the blades 183. Since the effective diameter of the pulley 162 is small as compared to that of the pulley 163 and the pulley 165 has a larger effective diameter than the pulley 170 the air displacing means is driven with a higher rotational speed than the cylinder 173. The speed of rotation of the cylinder 173 in operation is about 300 rev/min, whereas the impeller forming the air displacing means is driven with a speed of about 2000 rev/min. It is desirable to have a ratio of about 1:7 between the speeds of rotation of the cylinder and the air displacing means.

In operation the air displacing means sucks air out of the space between the inner side of the cylinder 173 and the outer side of the impeller in a section region defined by the front side of the blocking plate 186. This air is blown out by the blades into the space between the inner side of the cylinder 173 and the outer side of the blades in a non-suction region located behind the blocking plate 186, viewed in the direction of movement A. In this way subatmospheric pressure in the suction region at the front of the blocking plate 186 so that air is sucked in through the apertures 187 on the front and bottom sides of the cylinder 173. The air is blown out through the apertures 187 located in the non-suction region behind the blocking plate 186. When the machine moves forwards in the direction A stalks lying on the ground are attracted by suction against the outer side of the cylinder and carried in the direction of rotation N to a point located behind the rear side of the blocking plate 186, where the stalks are blown off the cylinder by the air emerging through the apertures 187. The stalks blown off are discharged in the gutter-like space formed by the plate construction 157, the stalks dropping on the plate portion 188, which is laterally and rearwardly inclined, so that the stalks are passed to the rear end of the machine, where they are deposited in a swath. Since the blades are located on the rear and bottom sides at a very small distance from the inner surface of the cylinder 173 and will rotate near the front side with a very slight amount of clearance along the bottom side of the blocking plate 186, whereas the top side of the blocking plate 186 is located very near the inner side of the cylinder 173, direct air flows between the subatmospheric pressure region and the excess pressure region are avoided. Stalks carried on by the cylinder 173 to an excessive extent are scraped off the cylinder wall by the connecting piece 185.

Figure 17:
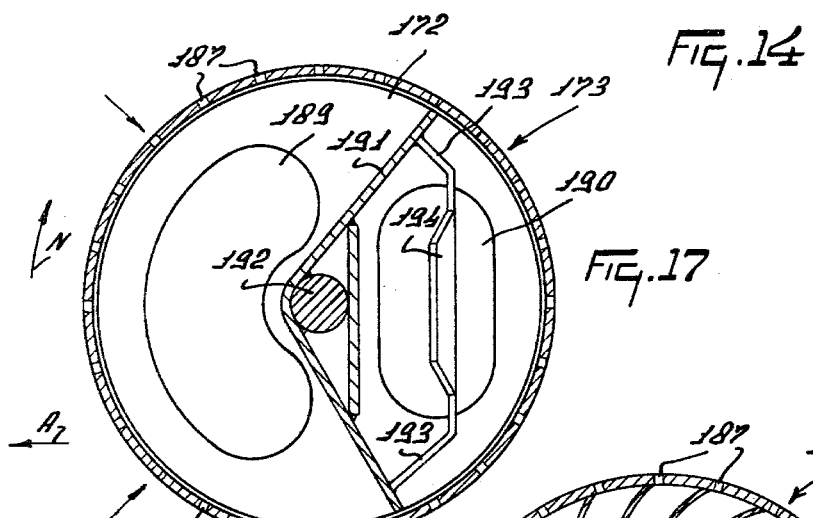
FIG. 17 shows a first modification of the construction shown in the sectional view of FIG. 15.

FIG. 17 shows in a general fashion a further possibility of combining the cylinder 173 with suction and discharge abilities. The end partition 172 located near the front end of the cylinder 173 has two openings 189 and 190 lying one behind the other in the direction of movement A and occupying a large portion of the partition 172. The other end partition 177 is closed. Between the two openings 189 and 190 is arranged a V-shaped separating partition 191, which is fastened to a shaft 192 extending over the whole length of the cylinder. The shaft 192 is a non-rotatable shaft, which is secured to the supports 167 and 180. The V-shaped separating partition 191, the shape and disposition of which are shown in FIG. 17, is orientated to the front by its tip fastened to the shaft 192, the sides of the V being symmetrical to a horizontal plane going through the center line of the shaft 192. The ends of the partition 191 are located at a very small distance from the inner side of the cylinder 173. By means of brackets 193 the partition 191 is provided on its rear side with an air distributing plate 194, which is located approximately centrally in front of the inlet opening 190, as is shown in the axial view of FIG. 17. Viewed parallel to the shaft 192 the plate 194 covers part of the length of the cylinder 173, for example, half the length thereof. Contrary to the embodiment shown in FIG. 15, the end partition 172 fastened to the support 167 is stationary, whereas the cylinder 173 is connected by means of supports (not shown) with the pulley 165. In this embodiment only the cylinder 173 is rotating.

Outside the cylinder 173 at the place where the screening casing 175 of the preceding embodiment is shown a fan (not shown) is provided so that its intake opening communicates with the opening 189 and the discharge opening communicates with the opening 190. Viewed in the direction of movement A, a suction region at the front part of the cylinder 173 and in front of the separating partition 191 the fan produces subatmospheric pressure so that air will flow in through the apertures 187. This air, which is pushed by the fan through the inlet opening 190 in the part of the cylinder 173 which is located behind the partition 191, is blown out through the apertures 187 in a non-suction region at the rear part of the cylinder 173. The air distributing plate 194 ensures that the air is blown out near the end partition 172 through the apertures 187 and also near the end of the cylinder 173 located near the end partition 177. If desired, a fan may be disposed at both ends of the cylinder 173.

In operation the front and bottom sides of the cylinder 173, moving at a small height above the ground, encounter stalks lying on the ground, which are attracted to the outer side of the cylinder by the air sucked in through the apertures 187. The stalks are carried in the direction of rotation N. The suction force exerted on the stalks is maintained as far as beyond the top end of the partition 191, after which the stalks enter the non-suction region where air is blown out through the apertures 187 so that the stalks are released in the region behind the partition 191 and drop into the diverging, downwardly inclined gutter, parts of which are formed by the plate portions 185 and 188.

Figure 18:
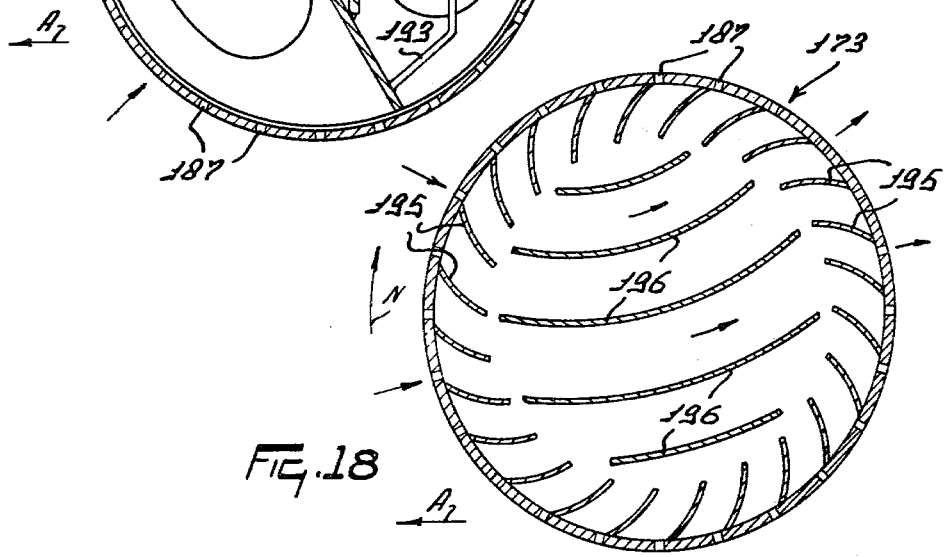
FIG. 18 shows a second modification of the construction shown in the sectional view of FIG. 15.

FIG. 18 shows schematically a further potential embodiment of a machine in accordance with the invention illustrated in FIGS. 13 and 14. The cylinder 173, rotating in operation, is provided on its inner surface with a great number of uniformly distributed blades 195. The cylinder 173 and the blades 195 may be directly secured to the pulley 165. In the space defined by the inner boundaries of the blades 195 a number of guide vanes 196, for example five guide vanes, are directly secured, for example, to the supports 167 and 180 so that in operation these vanes are not rotating. From FIG. 18 it will be apparent that the vanes 196 are curved so that at both ends they join the inner sides of the blades 195 fastened to the cylinder 173 and rotating on either side of the vanes 196 in the direction N. The vanes 196 extend the whole axial length of the cylinder 173.

When the cylinder 173 is driven, air will be drawn in at a section region on the front and bottom sides through the apertures 187 by the blades 195 and the stationary guide vanes 196 will guide this air in the direction of the vanes 196 towards the rotating blades 195 on the rear side of the cylinder, viewed in the direction of movement A, so that the air is blown out at a non-suction region on the rear side through the openings 187. When the cylinder is moved in the direction A, stalks will be attracted to the front and bottom sides of the cylinder 173 and be carried in the direction N. These stalks are blown off the cylinder on the rear side into the gutter formed by the plate construction 157 and owing to the inclined position of said gutter the stalks are deposited in a swath behind the machine.

The embodiments described may be employed not only in the above-mentioned haymaking or tedding machines but also as pick-up devices for stalks and stems associated with other machines such as charging wagons, balers, crushers, combined mowing and threshing machines and the like.

The pick-up and displacing devices for stalks and stems according to the invention ensure that the stalks are efficiently picked up and substantially no stalk part will be left on the ground, while by the lack of tines as crop displacing members the field will not be spoiled by broken-off pieces of tines, which may hinder the operation of other machines such as forage harvesters. The machines according to the invention furthermore permit of working with high speed without stalks being left behind.

In the four described embodiments of the invention, some features, such as the type of rotor, the number of rotors, the linkage for connecting the machine to a tractor and the guide arrangements for forming swaths have been described and illustrated in connection in different forms in the different embodiments. However, it will be appreciated that a form of a feature shown in connection with one embodiment could equally well be used with one or more of the other embodiments.

Although various features of the agricultural machines that have been described, and that are illustrated in the drawings, will be set forth in the following claims as inventive features, it is to be noted that the invention is not necessarily limited to these features and that it may encompass all of the features that have been described both individually and in various combinations.

I claim:

1. An agricultural machine for the displacement of crop, such as stalks, comprising a frame movable over the ground and a rotatable air-permeable screen that defines an interior air chamber supported on said frame, air displacing means in said air chamber and said screen having an outer crop-engaging surface, driving means connected to rotate said screen and said air displacing means about an axis, said air displacing means being positioned in said air chamber whereby it is caused by said rotation thereof to induce a pressure differential across said outer surface, whereby crop adheres to said screen due to suction and is moved during the rotation of the screen.

2. An agricultural machine as claimed in claim 1, wherein at least part of the outer surface of the screen is intermittently under suction induced by said air displacing means during the rotation of the screen.

3. An agricultural machine as claimed in claim 2, wherein said screen is mounted for rotation about an upwardly extending axis.

4. An agricultural machine as claimed in claim 2, wherein said screen is mounted for rotation about a substantially horizontal axis.

5. An agricultural machine as claimed in claim 2, wherein a first angular region of said screen, relative to its rotary axis, is a suction region and a second angular region, relative to said rotary axis, is a non-suction region.

6. An agricultural machine as claimed in claim 5, wherein an air blocking member is positioned within the air chamber adjacent the non-suction region.

7. An agricultural machine as claimed in claim 5, wherein said air displacing means is arranged to blow air through the screen in said non-suction region.

8. An agricultural machine as claimed in claim 5, wherein at least part of said suction region is positioned in front of said rotary axis, with respect to the normal direction of travel.

9. An agricultural machine as claimed in claim 8, wherein at least part of the non-suction region is positioned behind said rotary axis.

10. An agricultural machine as claimed in claim 5, wherein said screen comprises a substantially smooth wall.

11. An agricultural machine as claimed in claim 5, wherein said screen has a generally circular outer surface.

12. An agricultural machine as claimed in claim 11, wherein said air displacing means is housed within said screen.

13. An agricultural machine as claimed in claim 5, wherein said air displacing means is located outside the air chamber.

14. An agricultural machine as claimed in claim 5, wherein said air displacing means comprises blades that are driven in rotation by said driving means.

15. An agricultural machine as claimed in claim 14, wherein the axis of rotation of said blades coincides with that of said screen.

16. An agricultural machine as claimed in claim 14, wherein the axis of rotation of said blades is parallel to and spaced from the rotary axis of said screen.

17. An agricultural machine as claimed in claim 14, wherein said blades and the screen have respective connections to said driving means and are driven at different speeds of rotation about a common axis.

18. An agricultural machine as claimed in claim 17, wherein the ratio between the speeds of rotation of said blades and said screen is about 7:1.

19. An agricultural machine as claimed in claim 5, wherein said screen is a hollow cylinder with apertures located about its entire circumference.

20. An agricultural machine as claimed in claim 19, wherein said cylinder is mounted for rotation about a substantially horizontal axis, and the latter is inclined to the normal direction of machine travel.

21. An agricultural machine as claimed in claim 106, wherein said cylinder is normally positioned adjacent the ground during operation.

22. An agricultural machine as claimed in claim 20, wherein said suction region is located at the front of said cylinder.

23. An agricultural machine as claimed in claim 22, wherein said suction region is located adjacent the top and/or rear of said cylinder.

24. An agricultural machine as claimed in claim 23, wherein a crop scraper is positioned at the rear of said cylinder.

25. An agricultural machine as claimed in claim 23, wherein said air displacing means is a rotatable blade wheel that extends axially for substantially the length of said cylinder, a small radial clearance being formed between said blade wheel and one portion of the interior wall of said cylinder.

26. An agricultural machine as claimed in claim 25, wherein the space between the interior wall of the cylinder and the outer circumference of said blade wheel is divided into two zones by a fixed blocking plate.

27. An agricultural machine as claimed in claim 25, wherein said cylinder has two axial end faces and said faces are closed.

28. An agricultural machine as claimed in claim 27, wherein at least one of said end faces has both an air inlet port and an air outlet port.

29. An agricultural machine as claimed in claim 28, wherein a partition separates the space inside said cylinder into a first chamber communicating with said inlet port and a second chamber communicating with said outlet port.

30. An agricultural machine as claimed in claim 29, wherein said partition is mounted in fixed position within said cylinder and the latter rotates about said partition during operation.

31. An agricultural machine as claimed in claim 30, wherein said inlet and outlet ports communicate respectively with the discharge and intake of said air displacing means and the latter comprises a fan.

32. An agricultural machine as claimed in claim 19, wherein said air displacing means comprises nonrotatable vanes mounted inside said cylinder and blades fixed to said cylinder, said cylinder and blades being rotatable around said vanes whereby, air is sucked into the cylinder in the suction region and discharged in the non-suction region.

33. An agricultural machine as claimed in claim 19, wherein a delivery device for delivering crop is connected to the machine and located to the rear of said screen.

34. An agricultural machine as claimed in claim 33, wherein said deliverfy device is a gutter that is inclined towards the ground.

35. An agricultural machine as claimed in claim 34, wherein said delivery device is divergent in the intended direction of delivery of the displaced crop.

36. An agricultural machine as claimed in claim 35, wherein said delivery device is inclined with respect to the direction of travel.

37. An agricultural machine as claimed in claim 5, wherein said screen is positioned to deposit the crop in a swath.

38. An agricultural machine as claimed in claim 5, wherein said machine includes crop working members and said screen feeds crop to those members.

39. An agricultural machine as claimed in claim 5, wherein said screen is mounted for rotation about a substantially vertical axis.

40. An agricultural machine as claimed in claim 39, wherein said screen is positioned in the lower aspect of the machine.

41. An agricultural machine as claimed in claim 40, wherein the lower aspect of said screen is adjacent the ground.

42. An agricultural machine as claimed in claim 5, wherein said screen comprises a curved plate.

43. An agricultural machine as claimed in claim 42, wherein said screen is inclined to the horizontal.

44. An agricultural machine as claimed in claim 5, wherein said screen defines a conical plane.

45. An agricultural machine as claimed in claim 44, the axis of said conical plane coincides with the rotary axis of said screen.

46. An agricultural machine as claimed in claim 45, wherein the vertex of said conical plane is located above said screen.

47. An agricultural machine as claimed in claim 5, wherein said air displacing means is located in the lower portion of the machine.

48. An agricultural machine as claimed in claim 5, wherein said air displacing means is located above said screen.

49. An agricultural machine as claimed in claim 5, wherein said air displacing means comprises a fan.

50. An agricultural machine as claimed in claim 5, wherein said air displacing means is surrounded by an air outlet member and that member comprises a pump shell.

51. An agricultural machine as claimed in claim 5, wherein said air displacing means communicates discharge air at the lower portion of the machine.

52. An agricultural machine as claimed in claim 51, wherein said air displacing means directs air below said chamber and excess pressure is developed beneath the machine.

53. An agricultural machine as claimed in claim 52, wherein said machine is supported above the ground by an air cushion.

54. An agricultural machine as claimed in claim 5, wherein said screen is supported by a ground wheel and the latter is connected to a shaft that defines the axis of rotation of the screen.

55. An agricultural machine as claimed in claim 5, said air displacing means directs discharge air to the rear with respect to the normal direction of travel.

56. An agricultural machine as claimed in claim 5, wherein at least one crop guide is connected to the frame and positioned adjacent said outer surface.

57. An agricultural machine as claimed in claim 56, wherein there are two rotatable screens positioned side-by-side and said guide is located between the axes of rotation of said screens and to the rear thereof.

58. An agricultural machine as claimed in claim 51, wherein said guide comprises a swath basket.

59. An agricultural machine as claimed in claim 56, wherein said guide comprises at least one guide wall.

60. An agricultural machine as claimed in claim 56, wherein there are two spaced apart guide walls attached to the frame.

61. An agricultural machine as claimed in claim 56, wherein said guide is pivoted to the frame and at least partly freely movable in a vertical direction.

62. An agricultural machine as claimed in claim 5, wherein said screen comprises a wall with apertures and said apertures are spaced apart from one another by unequal distances.

63. An agricultural machine as claimed in claim 62, wherein said screen extends circumferentially about a substantially vertical axis of rotation and said apertures are more closely spaced together at the lower portion of said screen than at the upper portion thereof.

64. An agricultural machine as claimed in claim 5, wherein said screen is detachably fastened to said driving means.

65. An agricultural machine as claimed in claim 5, wherein an air blocking member is housed within said chamber.

66. An agricultural machine as claimed in claim 65, wherein said blocking member comprises a nonperforated blocking wall that partly covers the inner surface of said screen.

67. An agricultural machine as claimed in claim 66, wherein said blocking member is stationary relative to the rotary axis of said screen.

68. An agricultural machine as claimed in claim 67, wherein the angular position of said blocking member is adjustable around the rotary axis of said screen.

69. An agricultural machine as claimed in claim 68, wherein said blocking member is positionable to face a crop guide member and said member is interconnected to the frame adjacent said outer surface.

70. An agricultural machine as claimed in claim 5, wherein there are a plurality of screens arranged side by side and each screen is rotatable about a corresponding upwardly extending shaft.

71. An agricultural machine as claimed in claim 70, wherein adjacent screens are connected to the driving means and driven in relative opposite directions of rotation.

72. An agricultural machine as claimed in claim 71, wherein respective air blocking members are housed within corresponding air chambers and the blocking members of adjacent screens face each other.

73. An agricultural machine as claimed in claim 71, wherein the outlet ports of corresponding air displacing fans of two adjacent screens are positioned adjacent a vertical plane extending between the two screens and extending parallel to the direction of machine travel.

74. An agricultural machine as claimed in claim 5, wherein said frame has coupling means for connection to the hitch of a tractor and said coupling means comprises pivots that permit free movements in a vertical direction relative to the tractor.

75. An agricultural machine as claimed in claim 74, wherein said coupling means is connectable to the threepoint lift of a tractor.

76. An agricultural machine for displacement of crop, such as stalks, comprising a frame movable over the ground and at least one rotatable air permeable screen supported on beam means of said frame, said screen being generally circular and having an outer curved surface with apertures, fan means mounted relative to said screen whereby it rotates therewith and is caused to induce suction by said rotation communicating with an air chamber within the perimeter of said surface and driving means connected to rotate said screen and said fan means, said fan means being positioned to induce suction within the chamber and draw air through said apertures into said chamber, whereby crop adheres to said screen and is moved during the rotation of said screen.

77. An agricultural machine as claimed in claim 76, wherein a coupling is secured to the front of said frame and said beam means is pivoted to the coupling and pivotable about a horizontal axis that extends transverse to the direction of travel of the machine.

78. An agricultural machine as claimed in claim 76, wherein said beam means comprises a parallelogram linkage that is attached to said coupling.

79. An agricultural machine as claimed in claim 78, wherein pivotal axes of links of said parallelogram linkage extend horizontal and transverse to the direction of travel.

80. An agricultural machine as claimed in claim 77, wherein a supporting structure is rigidly secured to said coupling and said coupling is attachable to the threepoint lift of a tractor, said structure being located below said beam means to support same when the machine is lifted to transport position.

81. An agricultural machine for the displacement of crop, such as stalks, comprising a frame movable over the ground and at least one rotatable air permeable screen supported on beam means of said frame, said screen being generally circular and having an outer curved surface with apertures, air displacing means communicating with an air chamber within the perimeter of said surface and driving means connected to rotate said screen and said fan means, said air displacing means comprising fan means in said chamber being positioned to induce suction within the chamber and draw air through said apertures into said chamber, an air blocking member being positioned within said chamber between said surface and said air displacing means and said member selectively covering a sector of said screen and the apertures therein, whereby as said screen rotates crop adheres to the unblocked region of the screen and is deposited therefrom by the centrifugal force thereon caused by said rotation adjacent the blocked sector of said screen.

82. An agricultural machine as claimed in claim 81, wherein said screen is mounted on a sleeve that is rotated about an upwardly extending shaft and said driving means engages said sleeve.

83. An agricultural machine for the collection of crop lying on the ground, such as stalks, comprising a frame movable over the ground and a rotatable air-permeable screen that defines an interior air chamber supported on said frame, air displacing means being in communication with said air chamber and said screen having an outer crop-engaging surface, said outer surface comprising a circular substantially smooth wall with apertures and a fan being positioned in said chamber adjacent said wall, at least part of said wall forming the suction intake for said fan and driving means connected to rotate said screen and said fan, whereby crop is drawn against said rotating wall by suction and carried by the wall for a distance.

84. An agricultural machine as claimed in claim 83, wherein stationary air blocking means covers some of said apertures over a sector of the wall.

85. An agricultural machine for the displacement of crop, such as stalks, comprising a frame movable over the ground and at least one rotatable air permeable screen supported on beam means of said frame, said screen being generally circular and having an outer curved surface with apertures, fan means communicating with an air chamber associated with said screen, driving means connected to rotate said screen and fan means in the same direction, said wall being conical and having apertures at the lower portion thereof which forms an air intake, means guiding the discharge air from said air chamber towards the ground, whereby the discharge air pressure sustains the screen above the ground.

86. An agricultural machine as claimed in claim 85, wherein said screen and wall are mounted on upwardly extending sleeve means and said driving means is connected to the upper portion of said sleeve means.

87. An agricultural device for moving crop, said device comprising a circular chamber as seen in plan having perforations about its periphery, means to rotate said chamber about a substantially vertical axis, a plurality of fluid movement inducing blade means mounted in said chamber relative to its axis of rotation which are adapted to reduce the relative pressure of air in said chamber by centrifugal force when said chamber is rotated whereby when said device is operated, the air pressure adjacent said perforations outside said chamber is substantially greater than the air pressure adjacent said perforations in said chamber.

88. An agricultural device in accordance with claim 87 which includes means for blocking selected said perforations whereby crop adheres only to said perforations which are selectively not blocked and is dislodged from adjacent said perforations which are selectively blocked.

89. An agricultural device in accordance with claim 88 wherein said blocking means is disposed inside said chamber.

90. An agricultural device in accordance with claim 87 wherein discharge means is provided for discharging air from said blade means to under said chamber whereby support is provided therefor.

91. An agricultural machine for the displacement of crop lying on the ground, said machine comprising an air chamber which is defined at least in part by a surrounding rotatable air-permeable screen which during operation is adapted to rotate about an axis substantially perpendicular to the underlying ground whereby it is continuously proximate crop lying on the ground, means for rotating said screen, air evacuation means located in said chamber for providing that air pressure in said chamber is less than the air pressure surrounding said chamber whereby air is drawn into said chamber through said air-permeable screen and crop is initially drawn against said air-permeable screen and then displaced by its rotation.

92. An agricultural machine for the displacement of crop lying on the ground, said machine comprising an air chamber which is defined at least in part by a surrounding rotatable air-permeable screen which during operation is adapted to rotate proximate crop lying on the ground, means for rotating said screen about a substantially vertical axis, air evacuation means located in said chamber for providing that the air pressure in said chamber is less than the air pressure surrounding said chamber whereby air is drawn into said chamber through said air-permeable screen and crop is drawn from the underlying ground against said air-permeable screen and thereafter is displaced by its rotation.

93. An agricultural machine for the displacement of crop lying on the ground, said machine comprising an air chamber which is defined at least in part by a surrounding rotatable air-permeable screen which during operation is adapted to rotate proximate crop lying on the ground, means for rotating said screen, air evacuation means located in said chamber for providing that the air pressure in said chamber is less than the air pressure surrounding said chamber whereby air is drawn into said chamber through said air-permeable screen and crop which is drawn against said air-permeable screen is subsequently displaced by said air-permeable screens rotation, the rotation of said air-permeable screen actuating said air evacuation means.

94. An agricultural machine for the displacement of crop lying on the ground, said machine comprising an air chamber which is defined at least in part by a surrounding rotatable air-permeable screen which during operation is adapted to rotate proximate crop lying on the ground, means for rotating said screen, air evacuation means located in said chamber for providing that air pressure in said chamber is less than the air pressure surrounding said chamber whereby air is drawn into said chamber through said air-permeable screen and crop drawn against said air-permeable screen is thereafter displaced by its rotation.

95. An agricultural machine for the displacement of crop lying on the ground, said machine comprising an air chamber which is defined at least in part by a surrounding rotatable air-permeable screen which during operation is adapted to rotate whereby it is continuously proximate crop lying on the ground, means for rotating said screen about a substantially vertical axis, air evacuation means associated with said chamber for providing that air pressure in said chamber is less than the air pressure surrounding said chamber whereby air is drawn into said chamber through said air-permeable screen, said air evacuation means being in said air chamber, the rotation of said air-permeable actuating said air evacuation means whereby crop is drawn against said air-permeable screen and is thereafter displaced by its rotation.

96. An agricultural machine for the displacement of crop lying on the ground, said machine comprising an air chamber which is defined at least in part by a surrounding rotatable air-permeable screen which during operation is adapted to rotate about an axis substantially perpendicular to the underlying ground whereby it is continuously proximate crop lying on the ground, air evacuation means arranged to rotate said screen, said air evacuation means also associated with said chamber for providing that air pressure in said chamber is less than the air pressure surrounding said chamber whereby air is drawn into said chamber through said air-permeable screen and crop is initially drawn against said air-permeable screen and then displaced by its rotation.

97. An agricultural machine in accordance with claim 96 wherein said means for rotating said screen rotates same about a substantially vertical axis.

98. An agricultural machine in accordance with claim 97, wherein said air evacuation means is located in said chamber.

99. An agricultural machine for the displacement of crop lying on the ground, said machine comprising an air chamber which is defined at least in part by a surrounding rotatable air-permeable screen which during operation is adapted to rotate proximate crop lying on the ground, meansfor rotating said screen about a substantially vertical axis, said air-permeable screen being adapted by its rotation to actuate air evacuation means, said air evacuation means associated with said chamber for providingthat the air pressure in said chamber is less than the air pressure surrounding said chamber whereby air is drawn into said chamber through said air-permeable screen and crop is drawn from the underlying ground against said air-permeable screen and thereafter is displaced by its rotation.

* * * * *